(12) United States Patent
Saxena et al.

(10) Patent No.: US 12,539,092 B2
(45) Date of Patent: Feb. 3, 2026

(54) METHOD AND SYSTEM FOR FOCAL SPOT TRACKING AND REDUCING SCATTER CROSS TALK IN MEDICAL IMAGING

(71) Applicant: GE Precision Healthcare LLC, Wauwatosa, WI (US)

(72) Inventors: Shefali Saxena, Pewaukee, WI (US); Mark Adamak, Wauwatosa, WI (US); Biju Jacob, Niskayuna, NY (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 349 days.

(21) Appl. No.: 18/307,426

(22) Filed: Apr. 26, 2023

(65) Prior Publication Data
US 2024/0358334 A1 Oct. 31, 2024

(51) Int. Cl.
*A61B 6/08* (2006.01)
*A61B 6/03* (2006.01)
*A61B 6/42* (2024.01)
(52) U.S. Cl.
CPC .............. *A61B 6/08* (2013.01); *A61B 6/032* (2013.01); *A61B 6/4266* (2013.01)
(58) Field of Classification Search
CPC ......... A61B 6/08; A61B 6/032; A61B 6/4266; A61B 6/586; A61B 6/06; A61B 6/5205; A61B 6/582; A61B 6/585; A61B 6/4021; A61B 6/4291; A61B 6/44; G01T 1/2928; G01T 1/1648
See application file for complete search history.

(56) References Cited

U.S. PATENT DOCUMENTS

| | | |
|---|---|---|
| 5,859,893 A | 1/1999 | Moorman et al. |
| 6,950,492 B2 | 9/2005 | Besson |
| 9,014,328 B2 | 4/2015 | Funk |
| 9,076,563 B2 | 7/2015 | Mng |
| 9,541,656 B2 | 1/2017 | Dolinsky et al. |
| 10,779,778 B2 | 9/2020 | Rui et al. |

(Continued)

FOREIGN PATENT DOCUMENTS

| | | |
|---|---|---|
| DE | 102018216129 A1 | 3/2020 |
| JP | 2015000102 A | 1/2015 |

OTHER PUBLICATIONS

Spahn, M., "X-ray detectors in medical imaging," Nuclear Instruments and Methods in Physics Research Section A: Accelerators, Spectrometers, Detectors and Associated Equipment, vol. 731, Dec. 11, 2013, 7 pages.

(Continued)

*Primary Examiner* — Courtney D Thomas
(74) *Attorney, Agent, or Firm* — McCoy Russell LLP

(57) ABSTRACT

Various methods and systems are provided for a sensor design in a computed tomography (CT) detector of a medical imaging system. In one embodiment, a detector array may include a post-patient collimator assembly arranged between a detector array and an x-ray source, the collimator assembly having a plurality of collimator plates aligned substantially parallel with a radial direction of an imaging system, a plurality of imaging sensors located in the detector array, and a plurality of non-imaging sensors located in the detector array. In another embodiment, a method may include correcting an imaging sensor signal based on a signal output from a non-imaging sensor.

20 Claims, 12 Drawing Sheets

(56) References Cited

U.S. PATENT DOCUMENTS

| | | |
|---|---|---|
| 11,147,522 B2 | 10/2021 | Cai et al. |
| 2015/0173694 A1 | 6/2015 | Teshigawara |
| 2018/0136340 A1 | 5/2018 | Nelson et al. |
| 2018/0259657 A1 | 9/2018 | Fu |
| 2018/0317869 A1* | 11/2018 | Rui .................... A61B 6/4233 |
| 2019/0021687 A1 | 1/2019 | Kato et al. |

OTHER PUBLICATIONS

EP application 24169547.7 filed Apr. 10, 2024—Search Report issued Sep. 18, 2024; 8 pages.

JP application 2024-060882 filed 04APR2024—Office Action issued Aug. 6 2025, Machine Translation, 6 pages.

JP2015000102 English Abstract; Espacenet.com Nov. 5, 2025; 1 page.

* cited by examiner

METHOD AND SYSTEM FOR FOCAL SPOT TRACKING AND REDUCING SCATTER CROSS TALK IN MEDICAL IMAGING

FIELD

Embodiments of the subject matter disclosed herein relate to medical imaging, and more particularly, to sensor design in computed tomography (CT) detectors.

BACKGROUND

Computed tomography (CT) imaging systems may include one or more detectors or detector heads for imaging a subject, such as a patient. For example, the detectors may be positioned adjacent to the subject on a gantry to acquire CT imaging data with a wide field of view. Each detector may further be associated with a post-patient collimator which narrows acquired radiation for the detector. The acquired CT imaging data may then be used to generate a three-dimensional (3D) image of the subject. Accordingly, components may be configured such that high imaging fidelity may be obtained. For example, detectors of the CT may include a plurality of sensors positioned behind collimator plates. However, the positioning of collimator plates relative to the plurality of sensors may result in degradation of images and reduced image quality due to scattering of radiation.

BRIEF DESCRIPTION

This summary introduces concepts that are described in more detail in the detailed description. It should not be used to identify essential features of the claimed subject matter, nor to limit the scope of the claimed subject matter.

In one aspect, a system can include a collimator assembly arranged between a detector array of the detector assembly and a x-ray source, the collimator assembly having a plurality of post-patient collimator plates aligned substantially parallel with a radial direction of an imaging system, a plurality of imaging sensors located in the detector array extending parallel from the bottom edge of the collimator assembly and along an entire height of the detector array, and a plurality of non-imaging sensors located in the detector array and extending parallel from the bottom edge of and aligned with plurality of collimator plates. In this way, output signals generated from the plurality of non-imaging sensors may be used to correct output signals generated from the plurality of imaging sensors, which may reduce crosstalk, charge sharing between adjacent imaging sensors.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
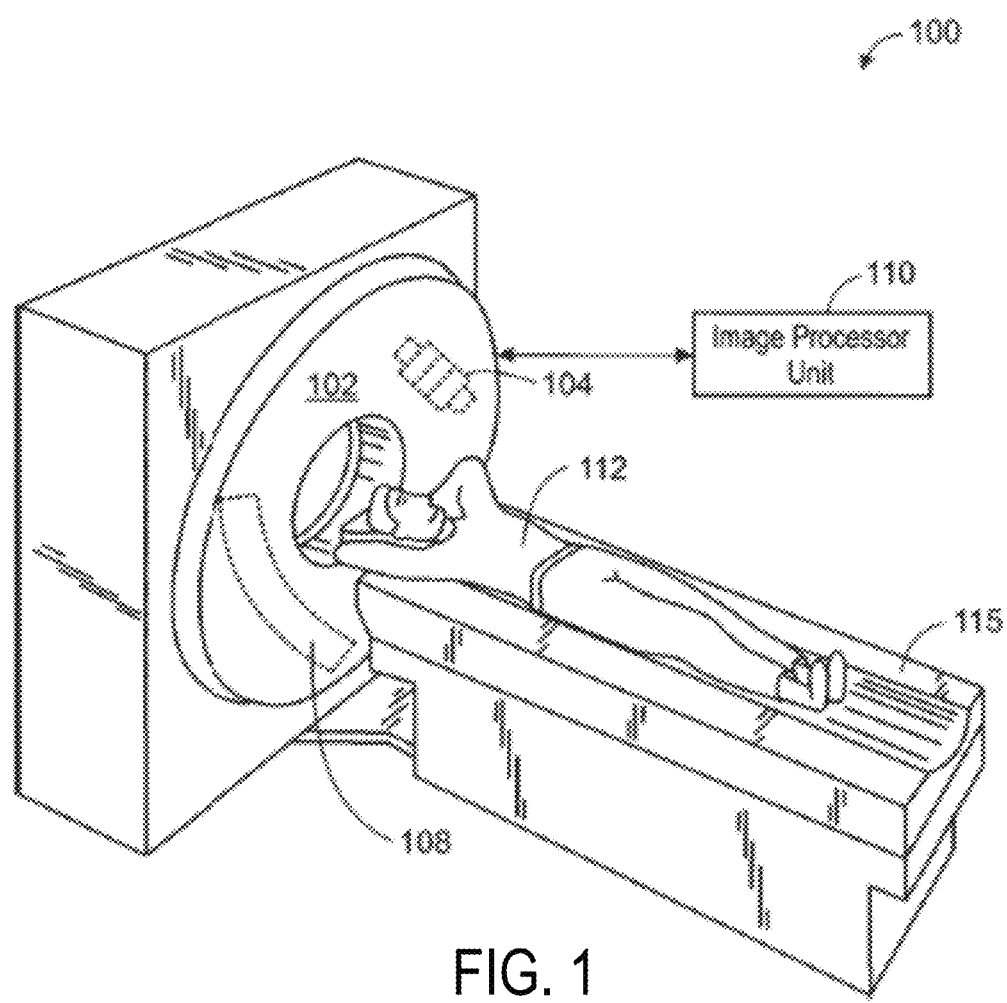
FIG. 1 shows a pictorial view of a CT imaging system that incorporates disclosed embodiments.

Embodiments of the present disclosure will now be described, by way of example, with reference to the FIGS. 1-12, which relate to various embodiments of a detector assembly of an imaging system. In particular, system and methods are provided for a detector assembly that includes a post-patient collimator assembly coupled to a detector array. The detector array may include a plurality of imaging sensors, a plurality of non-imaging sensors, the non-imaging sensors including dedicated sensors and specialized sensors. The plurality of non-imaging sensors may be sensors that are not used in an imaging chain of the imaging system, e.g., not used to acquire and process images, but instead used to increase a performance of imaging system based on alignment and corrections associated with a positioning of a collimator assembly.

For example, dedicated sensors may be used to measure collimator plate alignment and focal motion sensitivity and for correction. An output signal from the dedicated sensors, after being used to determine collimator plate behavior, may be corrected for to homogenize the signal of a channel with a desired perfect alignment. The specialized sensors may be temperature and humidity sensors which measure the temperature and humidity, respectively. Temperature and humidity may be converted to electrical signals. The plurality of non-imaging sensors may be located in regions of the detector array that may be shadowed, e.g., blocked, by the collimator assembly. As a result, these regions may be areas where few x-ray photons are able to reach and therefore may be regions of poor signal reception.

By positioning the plurality of non-imaging sensors in these regions, an active area, e.g., a surface area of the detector array that receives impinging photons without interference, may be maintained while additional, useful information may be obtained that enables the performance of the imaging system to be enhanced. For example, the dedicated sensors may be configured to determine an alignment of the collimator assembly relative to the detector array and correct for the collimator assembly alignment to increase an accuracy of focal spot tracking. The monitoring of the collimator assembly alignment provided by the dedicated sensors may alleviate tight tolerances in alignment between the collimator assembly and the detector array that is demanded for conventional detector assemblies.

The configuration of the detector array may enable adjustment of output signals generated by a plurality of imaging sensors based on output signals generated by the plurality of non-imaging sensors to correct for focal motion and ensure a target alignment of a plurality of collimator plates of a collimator assembly of the detector array. Adjusting output signals generated by the plurality of imaging sensors may increase image quality images generated from the processed output signals. Thus, according to embodiments described herein, a higher quality image producing detector array is provided.

Figure 2:
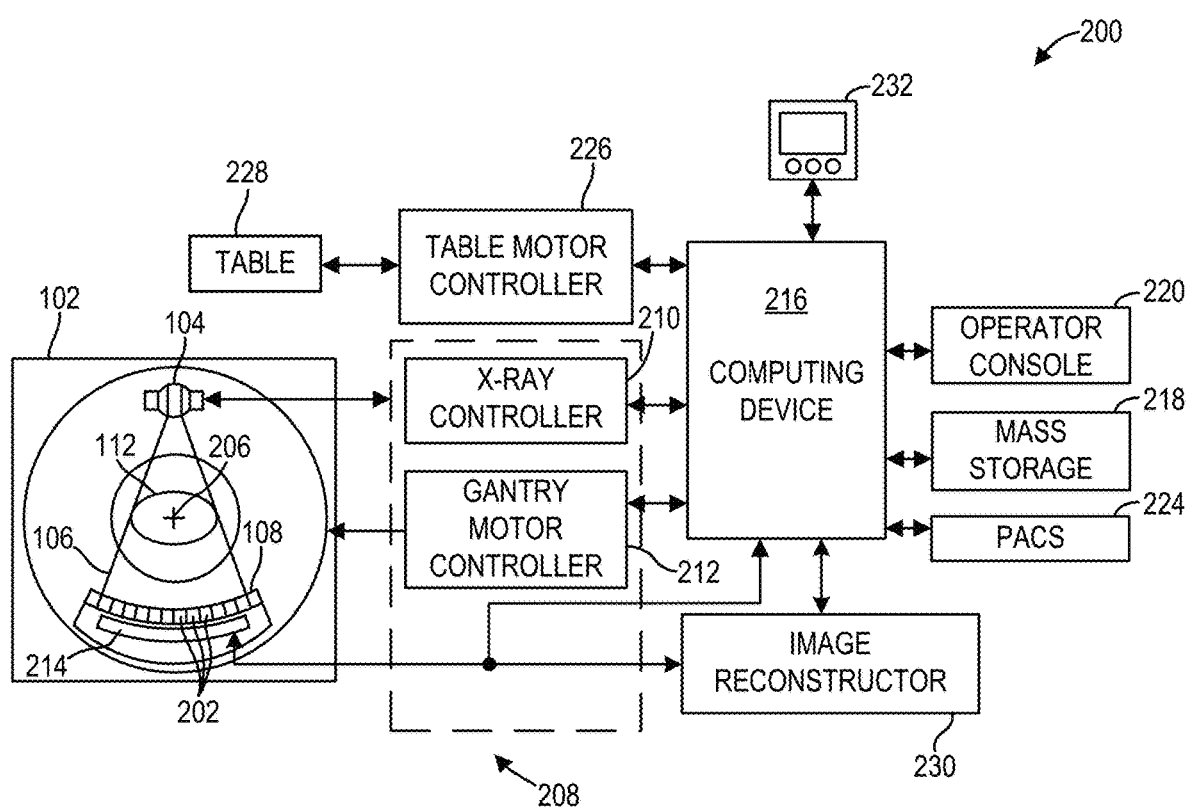
FIG. 2 shows a block schematic diagram of the system illustrated in FIG. 1.
Figure 3:
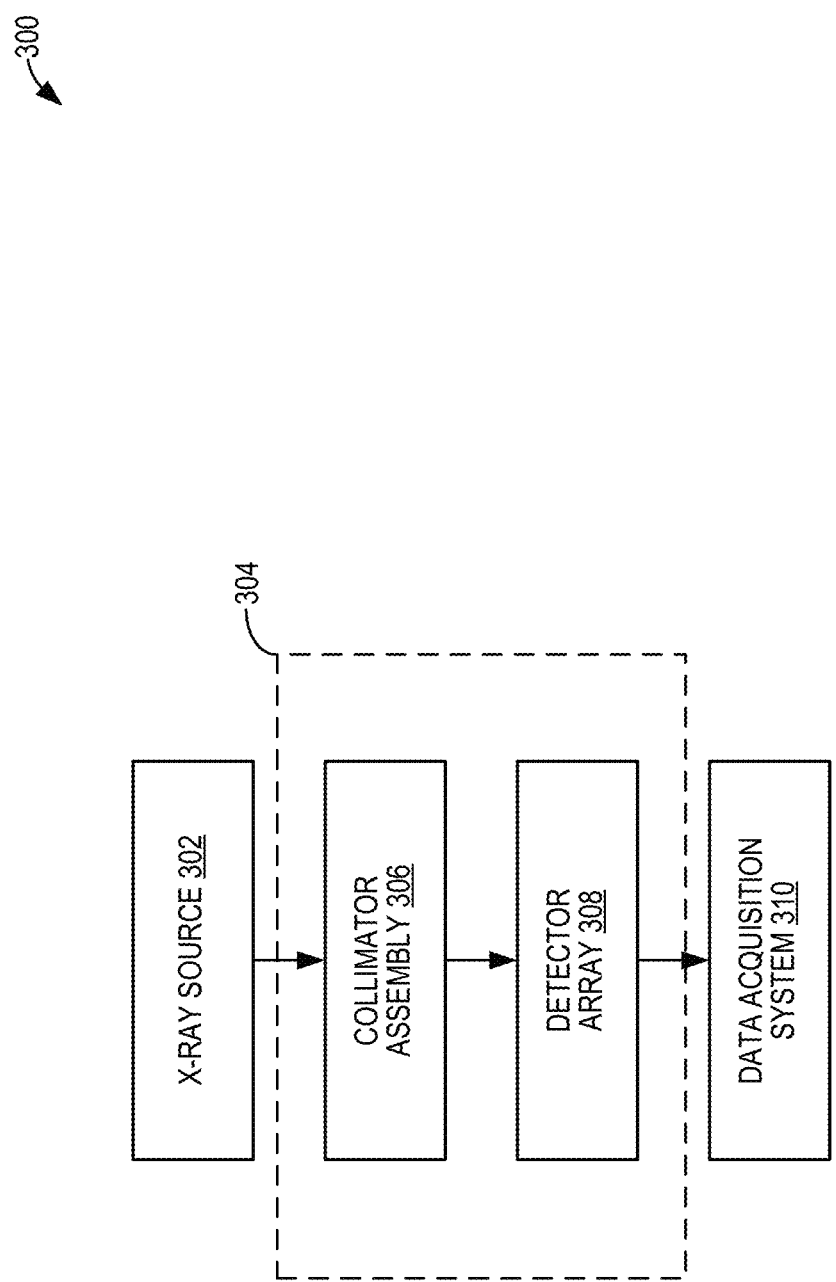
FIG. 3 shows a block schematic diagram of an imaging system that incorporates disclosed embodiments.
Figure 4:
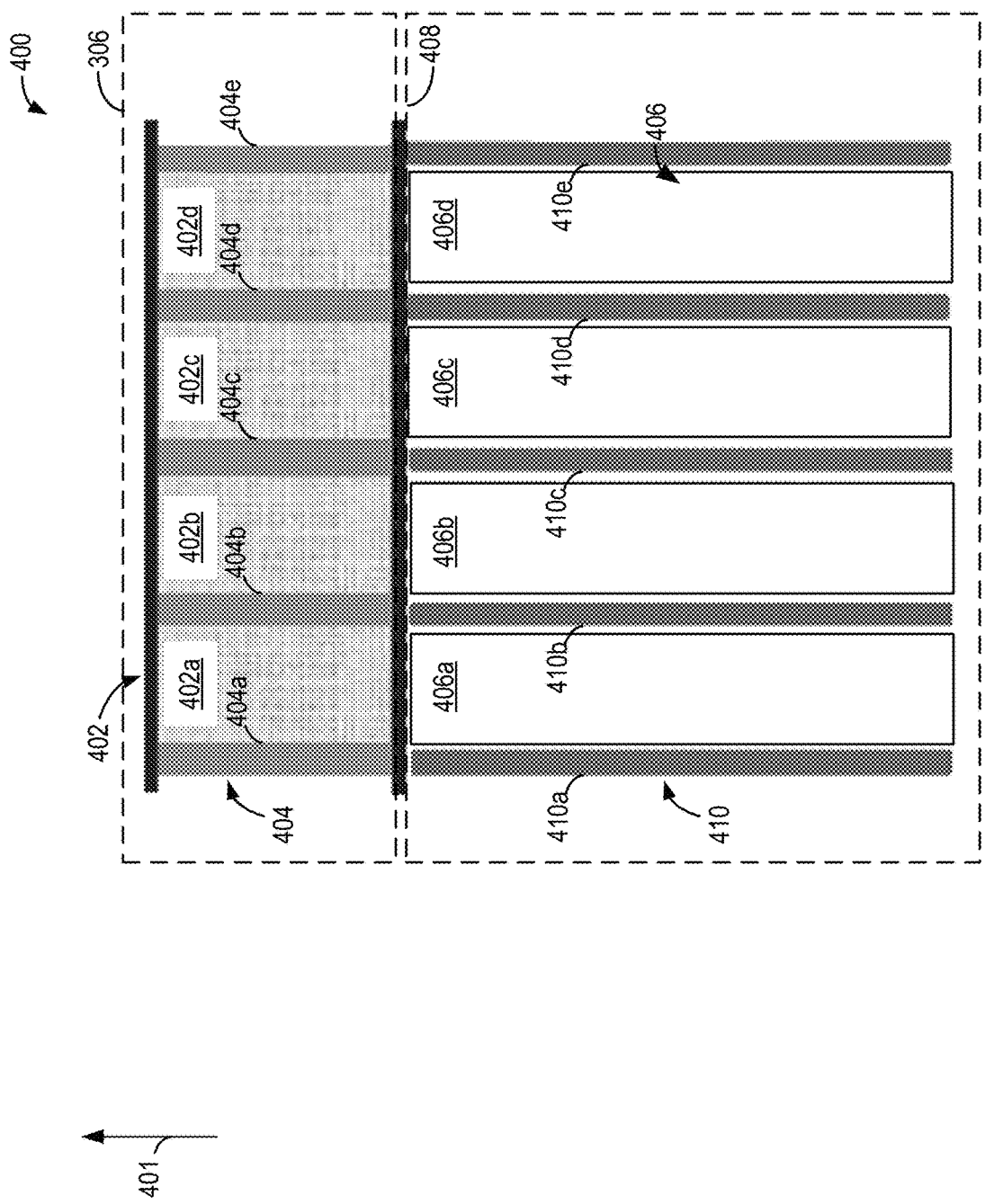
FIG. 4 shows a first example of an alignment configuration of a sensor-embedded detector assembly.
Figure 5:
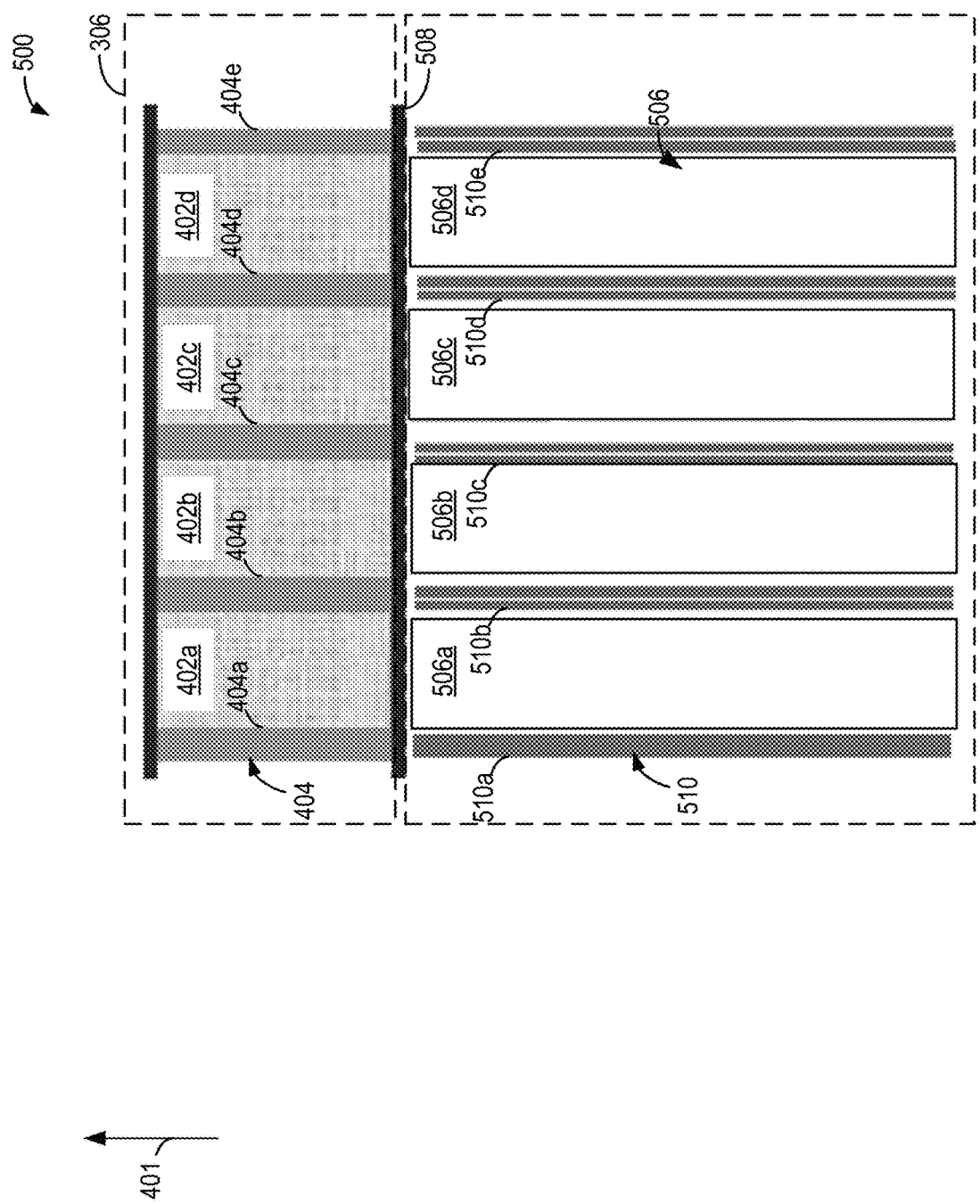
FIG. 5 shows a second example of an alignment configuration of sensor-embedded detector assembly.
Figure 6:
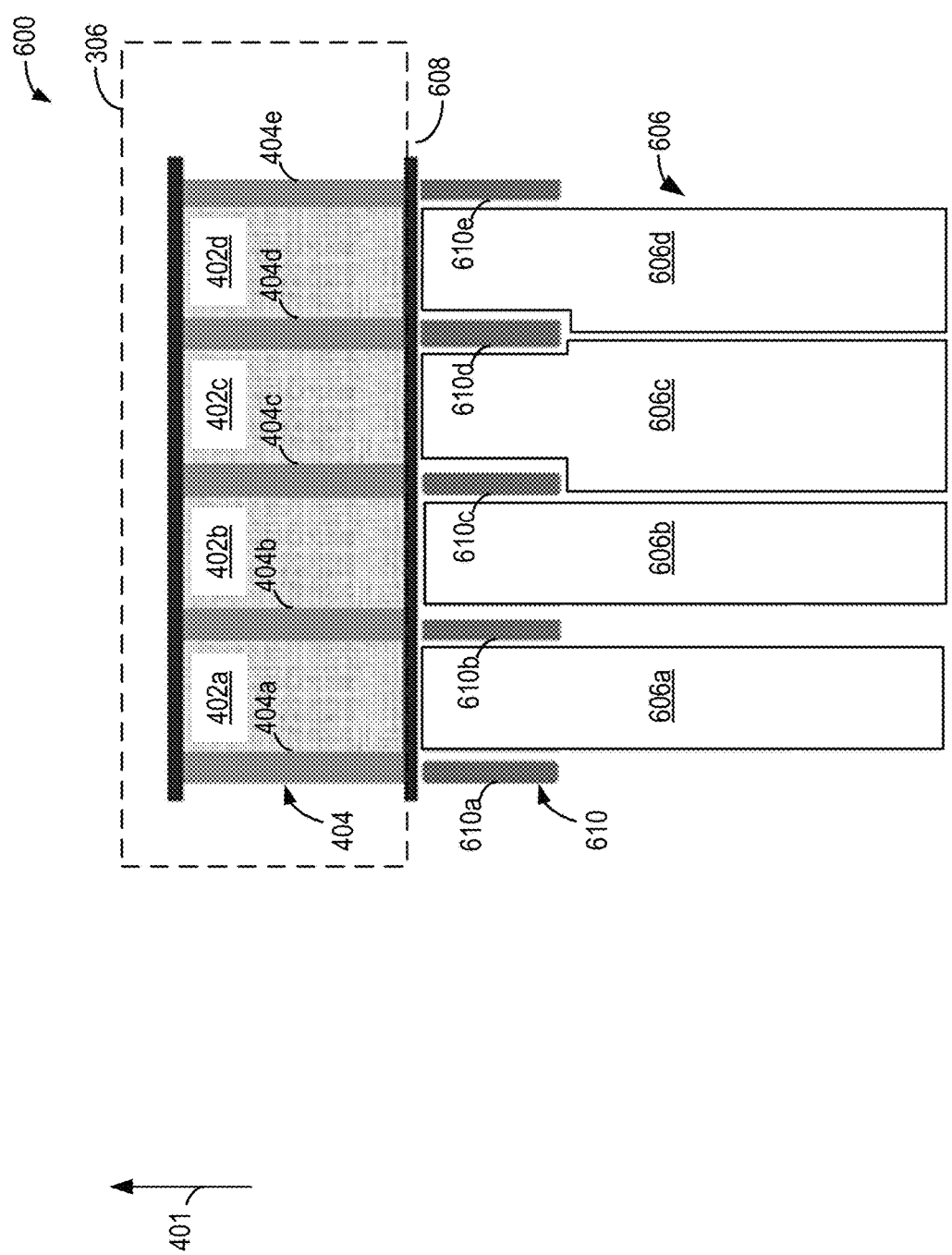
FIG. 6 shows a third example of an alignment configuration of a sensor-embedded detector.
Figure 7:
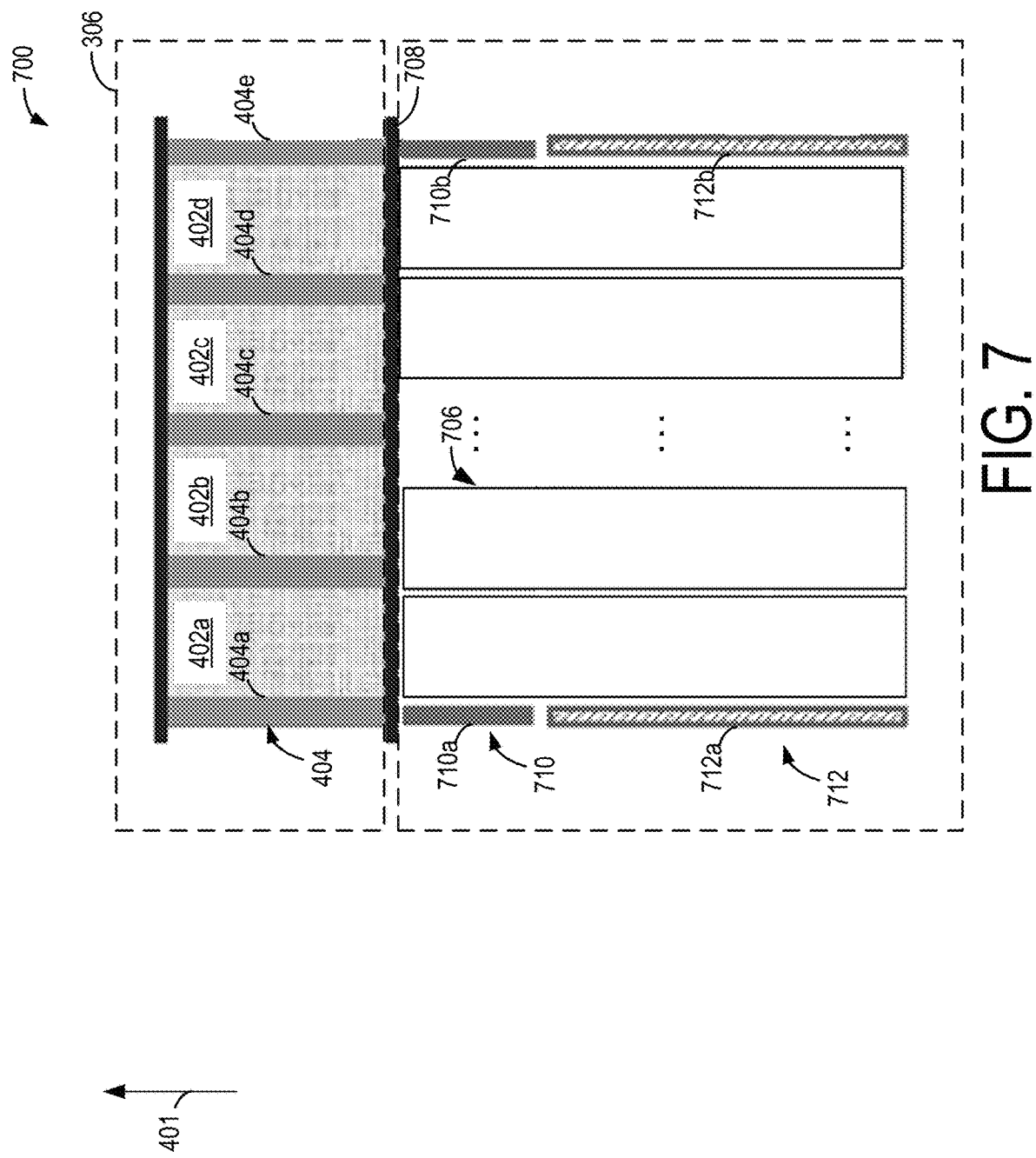
FIG. 7 shows a fourth example of an alignment configuration of a sensor-embedded detector.

An example medical imaging system that may be used to generate medical images based on medical imaging data obtained via a detector array is shown in FIGS. 1-3. In particular, FIGS. 1 and 2 show a computed tomography (CT) system, although it may be understood that the medical imaging data may be acquired via other imaging modalities in other examples that use an x-ray source. An example of a first alignment configuration of the detector array is shown in FIG. 4. An example of a second alignment configuration of the detector array is shown in FIG. 5. An example of third alignment configuration of the detector array is shown in FIG. 6. An example of a fourth alignment configuration of the detector array is shown in FIG. 7.

Figure 8:
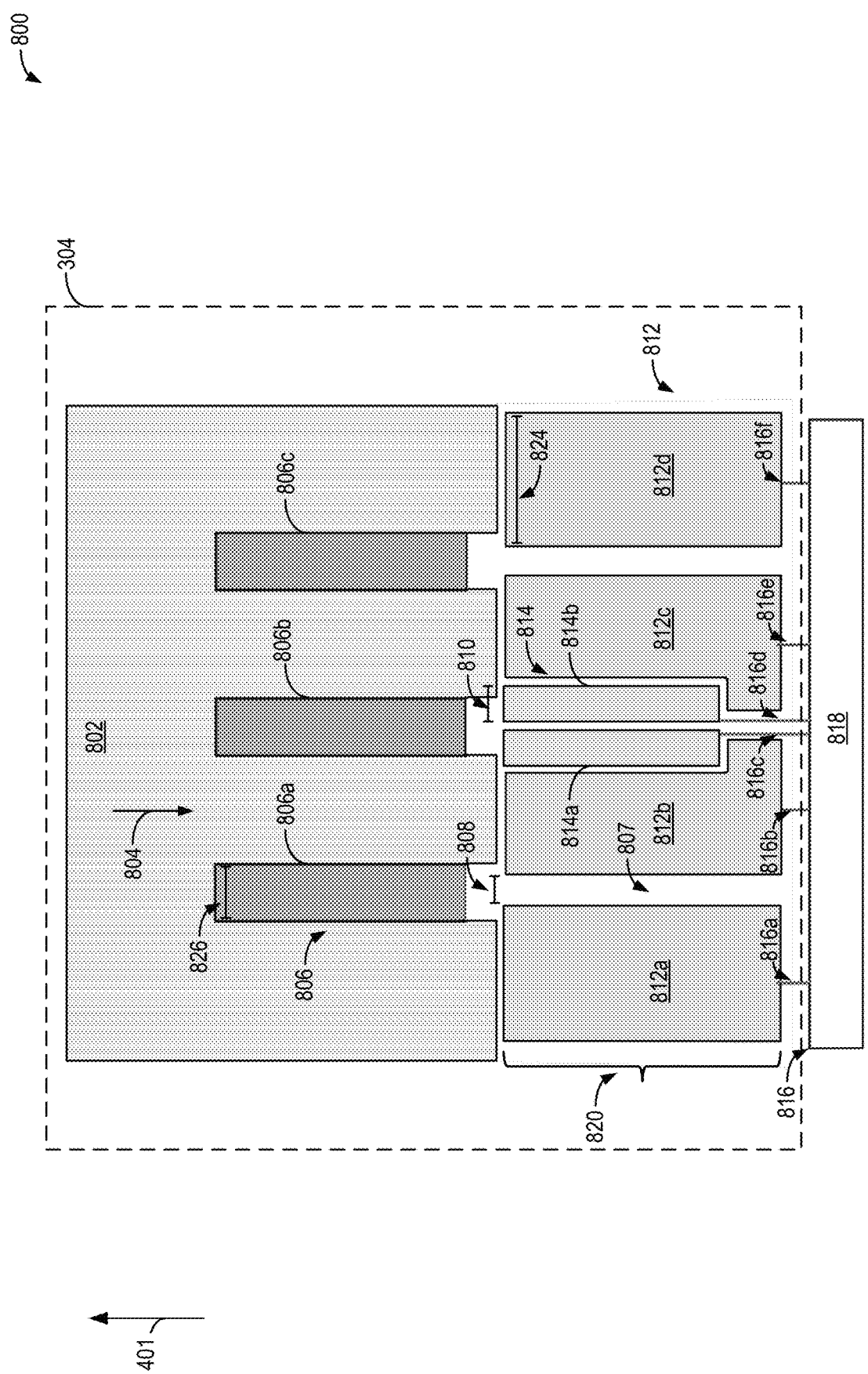
FIG. 8 shows a schematic diagram of an imaging system with a direct conversion detector assembly.
Figure 9:
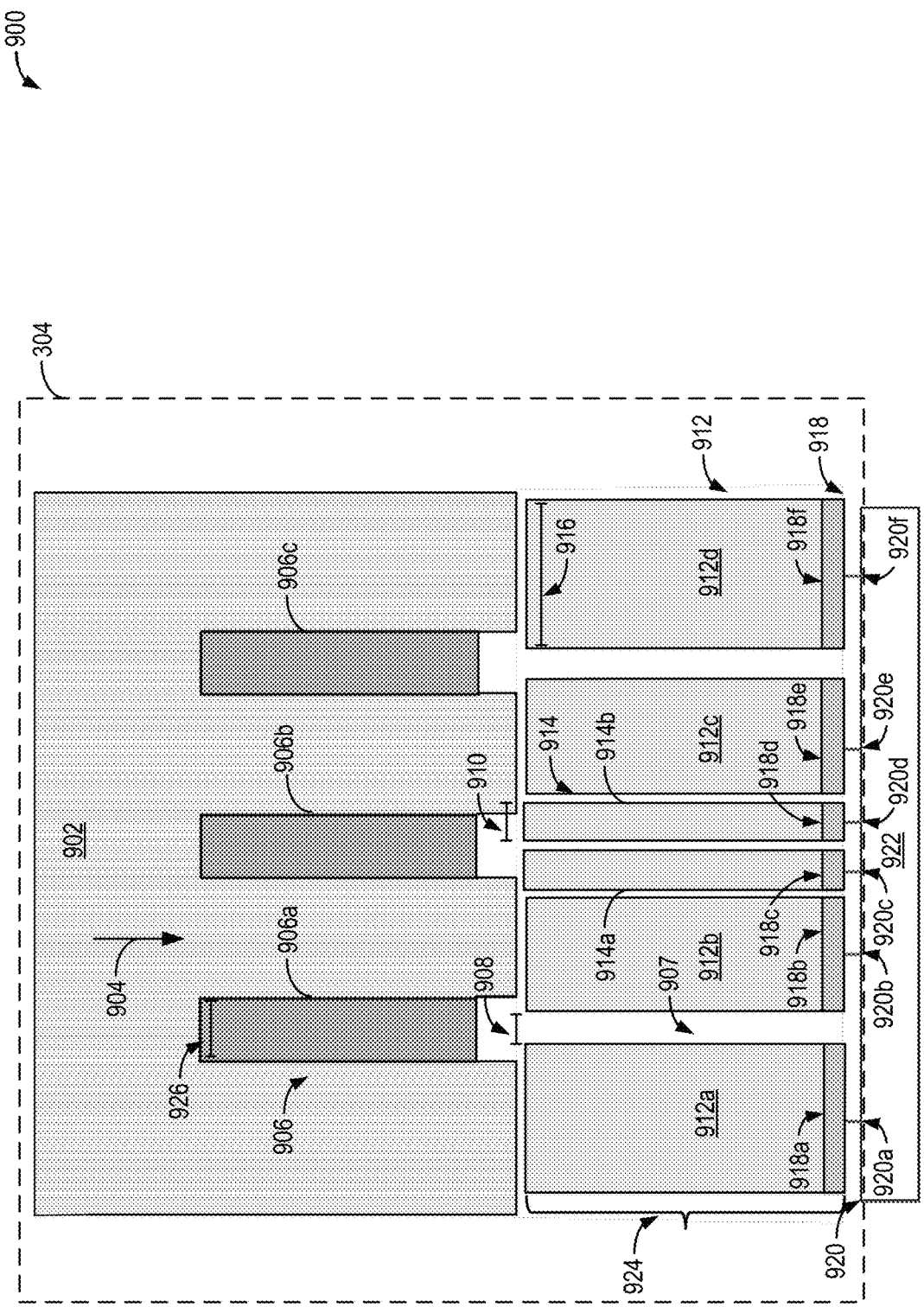
FIG. 9 shows a schematic diagram of an imaging system with an indirect conversion detector assembly.
Figure 10:
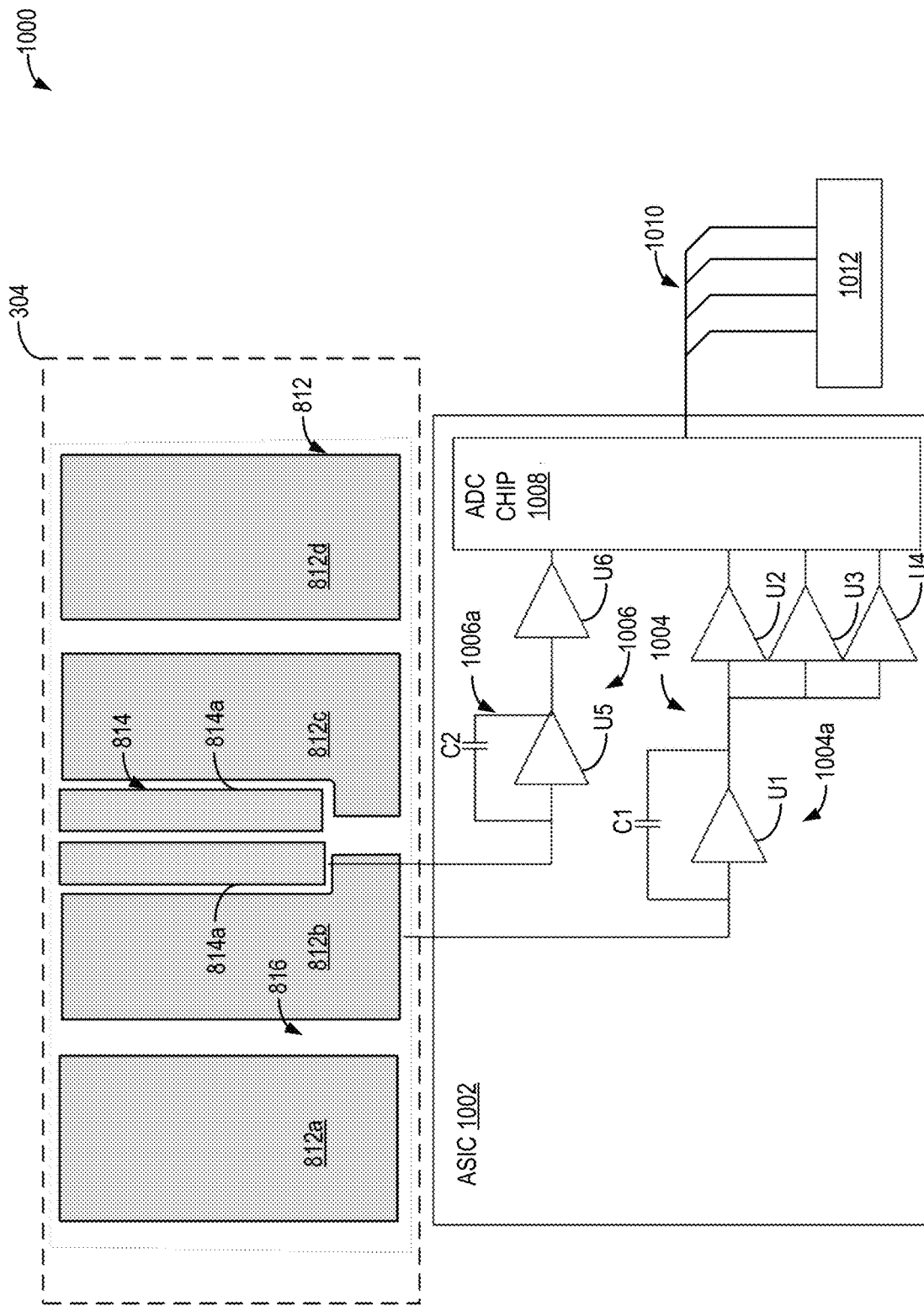
FIG. 10 illustrates a schematic diagram of circuitry of an application specific integrated circuit (ASIC) of a data acquisition system.

Various embodiments of the detector array may be integrated in imaging systems wherein a direct conversion detector array and an indirect conversion detector array as shown in FIG. 8 and FIG. 9, respectively. An example of an application specific integrated circuitry (ASIC) that filters and integrates output signals from imaging sensors separately from dedicated or specialized sensors is shown in FIG. 10. Adjustments to output signals generated by imaging sensors based on output signals generated by dedicated sensors or specialized sensors to correct for alignment of a collimator point and focal motion may be achieved according to the methods shown in FIG. 11 and FIG. 12.

FIG. 1 illustrates an exemplary CT imaging system 100 configured for CT imaging. Particularly, the CT imaging system 100 is configured to image a subject 112, such as a patient, an inanimate object such as a phantom, one or more manufactured parts, and/or foreign objects such as dental implants, artificial joints, stents, and/or contrast agents present within the body. In one embodiment, the CT imaging system 100 includes a gantry 102, which in turn, may further include at least one x-ray source 104 configured to project a beam of x-ray radiation for use in imaging the subject 112. Specifically, the x-ray source 104 is configured to project the x-rays towards a detector array 108 positioned on the opposite side of the gantry 102. Although FIG. 1 depicts only a single x-ray source 104, in certain embodiments, multiple x-ray sources and detectors may be employed to project a plurality of x-rays for acquiring, for example, projection data at different energy levels corresponding to the patient. In some embodiments, the x-ray source 104 may enable dual-energy spectral imaging by rapid peak kilovoltage (kVp) switching. In some embodiments, the x-ray detector employed is a photon-counting detector that is capable of differentiating x-ray photons of different energies. In other embodiments, the x-ray detector is an energy integrating detector in which the detected signal is proportional to the total energy deposited by all photons without specific information about each individual photon or its energy. In some embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT imaging system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. In some examples the image processor unit 110 may use an analytic image reconstruction approach such as FBP in addition to an iterative image reconstruction approach. In some embodiments, the image processor unit 110 may use a direct image reconstruction approach, such as using deep-learning trained neural networks.

In some CT imaging system configurations, the x-ray source 104 emits a cone-shaped beam which is collimated to lie within a plane of an X-Y-Z Cartesian coordinate system and generally referred to as an "imaging plane." The radiation beam passes through an object being imaged, such as the patient or subject 112. The beam, after being attenuated by the object, impinges upon the detector array 108 comprising radiation detectors. The intensity of the attenuated radiation beam received at the detector array 108 is dependent upon the attenuation of the radiation beam by the object. Each detector element of the array produces a separate electrical signal that is a measurement of the beam attenuation of a ray path between the source and the detector element. The attenuation measurements from all the detector elements are acquired separately to produce a transmission profile.

In some CT imaging systems, the radiation source and the detector array are rotated with a gantry within the imaging plane and around the object to be imaged such that an angle at which the radiation beam intersects the object constantly changes. A group of radiation attenuation measurements, e.g., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, a positron emission tomography (PET), a single-photon emission CT (SPECT) acquisition, and/or any other modality including modalities yet to be developed as well as combinations thereof in fused or hybrid embodiments.

The projection data is processed to reconstruct an image that corresponds to a two-dimensional slice taken through the object or, in some examples where the projection data includes multiple rotations or scans or two-dimensional (2D)

arrays of detectors, a three-dimensional (3D) rendering of the object. One method for reconstructing an image from a set of projection data is referred to in the art as the filtered back projection technique. Transmission and emission tomography reconstruction techniques also include statistical iterative methods, such as maximum likelihood expectation maximization (MLEM) and ordered-subsets expectation-reconstruction techniques, as well as iterative reconstruction techniques. This process may convert the attenuation measurements from a scan into values called "CT numbers" or "Hounsfield units" (HU), which are used to control the brightness of a corresponding pixel on a display device.

To reduce the total scan time, a "helical" scan may be performed. To perform a "helical" scan, the patient is moved while the data for the prescribed number of slices are acquired. The position of the source with respect to the patient in such a system traces a helix. The helix mapped out by the source yields projection data from which images in each prescribed slice may be reconstructed.

As used herein, the phrase "reconstructing an image" is not intended to exclude embodiments of the present invention in which data representing an image are generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT imaging system 100 of FIG. 1. The imaging system 200 is configured for imaging the subject 112. In one embodiment, the imaging system 200 includes the detector array 108 (see FIG. 1). The detector array 108 further includes a plurality of detector elements 202 that together sense the x-ray beams that pass through the subject 112 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 112 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 112 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 112. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors. Anti-scatter collimators comprising a plurality of collimator plates may be positioned on a detection side of the detector elements between the subject 112 and the detector array 108, as described herein with respect to FIG. 3. The post-patient (anti-scatter) collimators are used to manage the x-ray beams by either focusing the x-ray source 104 into a parallel beam that may be directed onto an area of interest or absorbing and attenuating scattered x-ray beams once they have emerged from the subject 112. In one example, an arrangement of the plurality of collimator plates may be leveraged to integrate additional sensors that are not used for acquiring images but instead, for monitoring conditions and spatial positioning of certain CT components.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 112, expressed in the densities of two basis materials. The density image may be displayed to show these features. In traditional approaches to diagnosis of medical conditions, such as disease states, and more generally of medical events, a radiologist or physician may consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202. The data sampled and digitized by the DAS 214 is transmitted to a computer or computing device 216. In one example, the computing device 216 stores the data in a storage device or mass storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a user interface (not shown), which may include one or more of a keyboard, a touchscreen, a mouse, a trackpad, and the like to allow the operator to specify the commands and/or scanning parameters.

Although FIG. 2 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which, in turn, may control a table 115 (see FIG. 1) or 228 which may be a motorized table. Specifically, the table motor controller 226 may move the table 115 (see FIG. 1) or 228 for appropriately positioning the subject 112 in the gantry 102 for acquiring projection data corresponding to the target volume of the subject 112.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200, and instead, the computing device 216 may perform one or more functions of the image reconstructor 230. Moreover, the image reconstructor 230 may be located locally or remotely and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

As described above, in some examples, the CT imaging system may include an anti-scatter collimator positioned between a subject to be scanned and the detector array. For example, an imaging system 300 comprising the anti-scatter collimator, e.g., a collimator assembly, is shown in FIG. 3. The imaging system 300 may include an x-ray source 302 emitting x-ray beams that, after being attenuated by a subject, enter a detector assembly 304. The x-ray source may be positioned on one side of a subject to be imaged. The detector assembly 304 may be arranged opposite of the x-ray source 302 on an opposite side of the subject. The detector assembly 304 comprises a collimator assembly 306, which may include a plurality of post-patient collimator plates, and a detector array 308. The collimator assembly 306 may be positioned adjacent to the detector array 308.

The plurality of post-patient collimator plates is aligned to direct impinging x-ray beams toward the detector array 308 while minimizing deflection of scattered photons. A plurality of post-patient collimator plates of the collimator assembly 306 extend away from a face of the detector array 308, perpendicular to the face of the detector array, and are aligned with the spaces between the columns of imaging sensors of the detector array. The detector array 308 comprises a plurality of imaging sensors and non-imaging sensors that are aligned in a specific manner with respect to the plurality of collimator plates. The detector array 308 may be a direct conversion detector array or an indirect conversion detector array. In some embodiments, the plurality of sensors may be the detector elements described above with respect to FIGS. 1 and 2. However, the positioning of the plurality of sensors with respect to the plurality of sensors may shadow regions of the detector array 308, blocking a portion of x-ray photons from reaching the detector array, which may reduce a signal-to-noise ratio.

In particular, the plurality of imaging sensors may be arranged in columns with spaces between the columns and a plurality of non-imaging sensors positioned in the spaces between the columns of a plurality of imaging sensors. A pitch of an imaging sensor relative to other imaging sensors differs based on a placement of a plurality of dedicated sensors or a plurality of specialized sensors of the plurality of non-imaging sensors.

Examples of different sensor-embedded detector assemblies are described herein with respect to FIGS. 4-7. Analog signals output from the plurality of sensors are transmitted to a data acquisition system (DAS) 310 where the analog signals are converted to digital signals. The digital signals may be processed by an image reconstructor, such as image reconstructor 230 of FIG. 2, to generate medical images for features of interest of the subject. In particular, DAS 310 may be a signal converting device, such as an application-specific integrated circuit (ASIC). The designated circuits in the signal converting device filter, integrate, and split output signals from the plurality of imaging sensor signals separately from the plurality of dedicated sensors and the plurality of specialized sensors of the non-imaging sensors.

Figure 11:
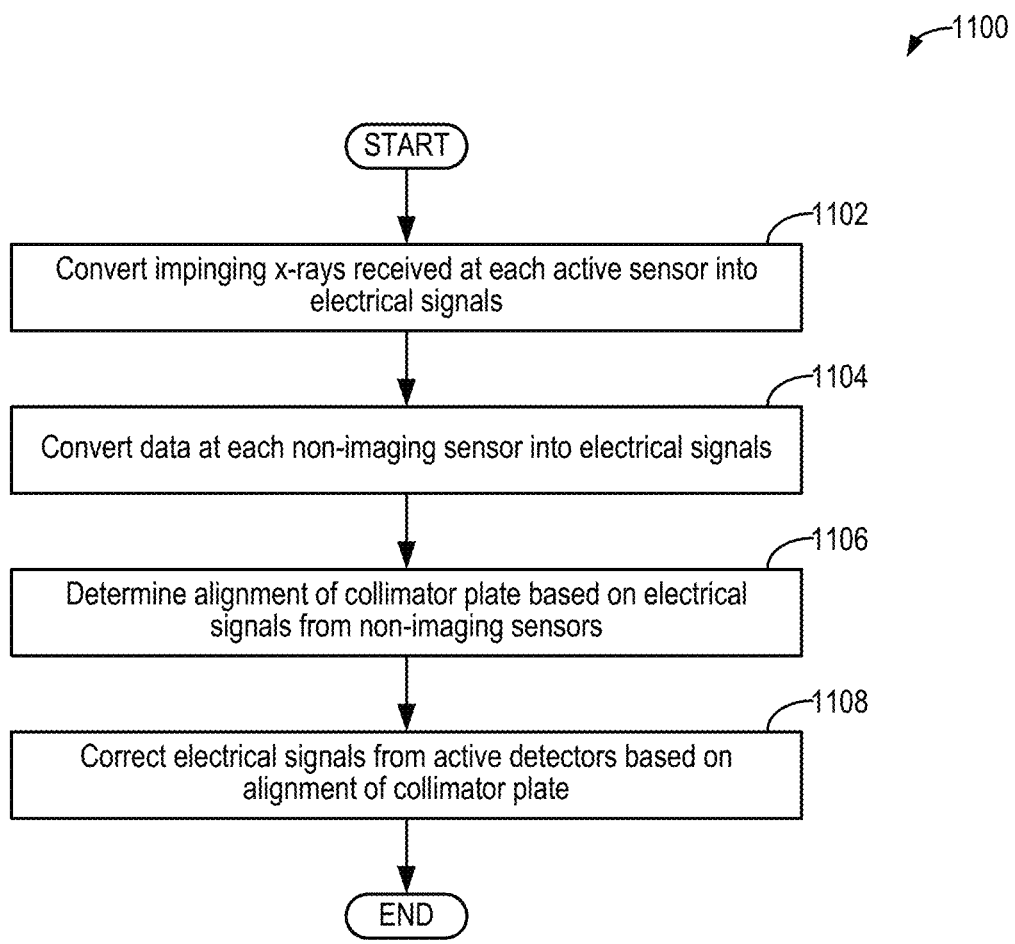
FIG. 11 is a flow chart illustrating an example method for determining collimator plate alignment according to embodiments described herein.
Figure 12:
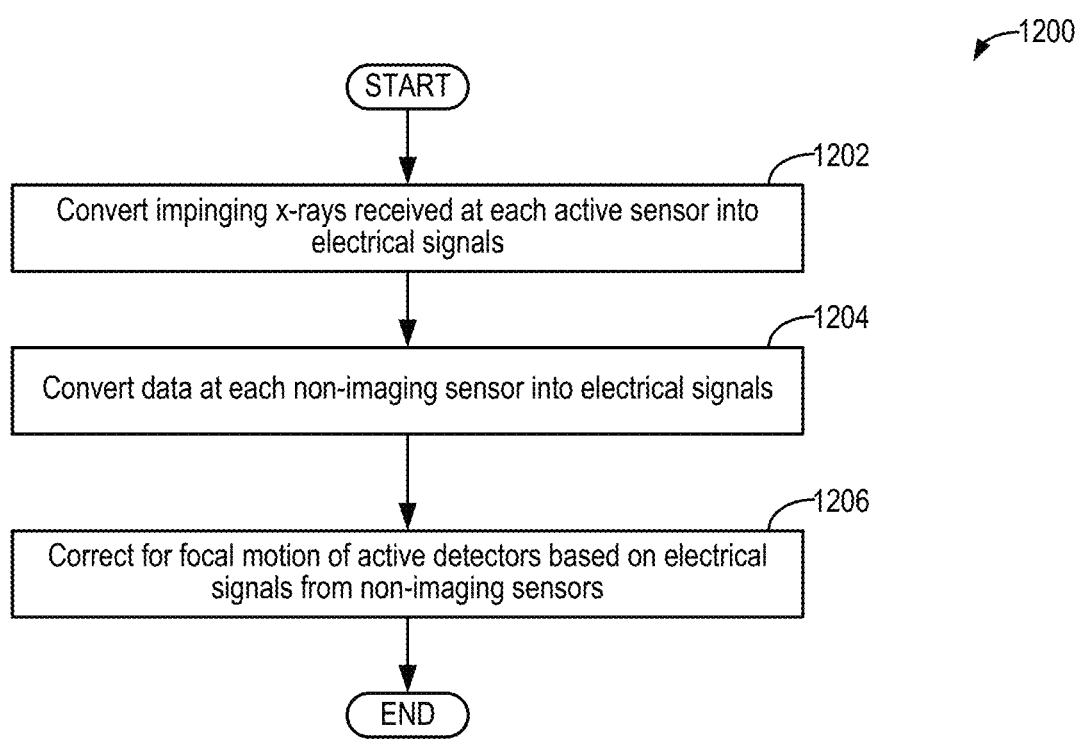
FIG. 12 is a flow chart illustrating an example method for focal motion correction according to embodiments described herein.

The imaging system 300 may include a computing device (e.g., not shown) comprising a processor and executable instructions stored in non-transitory memory that, when executed, cause the processor to correct the output signal of the plurality of imaging sensors based on an output of the plurality of non-imaging sensors according to the method described with respect to FIGS. 11 and 12. Output signals of the plurality of imaging sensor are processed to generate a medical image, output signals of dedicated sensors of the plurality of non-imaging sensors are processed to detect a focal spot location, and output signals of specialized sensors of the plurality of non-imaging sensors are processed to monitor temperature, humidity, and strain-gauge measurements.

As shown in FIGS. 4-7, various embodiments of a sensor-embedded detector assembly are illustrated. The embodiments of the sensor-embedded detector assembly are different examples of the detector assembly 304 of FIG. 3. The collimator assembly 306 is one embodiment of the collimator assembly described above with respect to FIG. 3 and depicted in each of FIGS. 4-7. The collimator assembly 306 comprises a plurality of spacers 402, such as a first spacer 402a, a second spacer 402b, a third spacer 402c, and a fourth spacer 402d. The plurality of spacers may have pre-determined dimensions with regards to length, width, and height. The plurality of spacers 402 may be fabricated from epoxy foam and other materials to enable x-ray beams to impinge toward sensors of detector arrays 408, 508, 608, and 708, as shown in FIGS. 4-7, respectively.

The collimator assembly 306 further comprises a plurality of collimator plates 404, such as a first collimator plate 404a, a second collimator plate 404b, a third collimator plate 404c, a fourth collimator plate 404d, and a fifth collimator plate 404e. The plurality of collimator plates 404 has pre-determined dimensions, with regards to length, width, and height. The plurality of collimator plates 404 may be fabricated from molybdenum and may direct impinging x-ray beams toward the detector array (e.g., the detector arrays of FIGS. 4-7). The plurality of spacers 402 may be positioned between the plurality of collimator plates and may be aligned substantially parallel with a radial direction 401 of an imaging system, such as the imaging system of FIG. 1, where the radial direction 401 represents a direction from the detector array towards a center of rotation of the CT imaging system (such as the center of rotation 206 of FIG. 2).

Turning to FIG. 4, a first example of a sensor-embedded detector assembly 400 is depicted. The sensor-embedded detector assembly 400 comprises the collimator assembly 306 and the detector array 408. The detector array 408 is one embodiment of the detector array 308 of FIG. 3. The detector array 408 comprises a plurality of non-imaging and a plurality of imaging sensors 406. The plurality of non-imaging sensors may be positioned proximate to an interface between the collimator assembly 306 and the detector array 408 along a height of the detector array, the height defined along the radial direction The plurality of non-imaging sensors may include a plurality of dedicated sensors 410, such as a first dedicated sensor 410a, a second dedicated sensor 410b, a third dedicated sensor 410c, a fourth dedicated sensor 410d, and a fifth dedicated sensor 410e. The plurality of dedicated sensors 410 may perform focal spot tracking, as one example. The plurality of dedicated sensors extend parallel from the bottom edge of the plurality of collimator plates and are aligned with the plurality of collimator plates. Each collimator plate is aligned with one of the dedicated sensors along the radial direction 401. As shown in the sensor-embedded detector assembly 400, each dedicated sensor extends along an entire height of the detector array 408.

In some embodiments, a width of a dedicated sensor, the width defined along a direction perpendicular to the radial direction 401, may be equal to a width of the collimator plate to which the dedicated sensor is aligned with. In other embodiments, the width of the dedicated sensor may be less than the width of the collimator plate to which the dedicated sensor is aligned with. In alternate embodiments, the width of the dedicated sensor may be greater than the width of the collimator plate to which the dedicated sensor is aligned with.

Furthermore, as shown in FIG. 4, a height of the plurality of dedicated sensors 410, the height defined along the radial direction 401, may be equal to a height of the detector array 408. However, in other examples, only a portion of the plurality of dedicated sensors 410 may extend along the entire height of the detector array 408. A remaining portion of the plurality of dedicated sensors 410 may extend partially along the height of the detector array 408. By integrating dedicated sensors that extend along the entire height of the detector array 408, signal correction may be performed by adding the dedicated sensor signal output to the imaging sensor channels.

The plurality of imaging sensors 406 may include a first imaging sensor 406a, a second imaging sensor 406b, a third imaging sensor 406c, and a fourth imaging sensor 406d. Signals output from the plurality of imaging sensors 406 may be processed to generate a medical image. The plurality of imaging sensors 406 extend parallel from the bottom edge of the plurality of spacers 402 and are aligned with the plurality of spacers. Each imaging sensor may be aligned with one of the spacers along the radial direction 401 and located between at least two dedicated sensors. As shown in the sensor-embedded detector assembly 400, each imaging sensor extends along an entire height of the detector array 408. In other examples, however, the plurality of imaging sensors 406 may instead extend along a portion of the height of the detector array 408.

As shown in FIG. 5, a second example of a sensor-embedded detector assembly 500 comprises the collimator assembly 306 and the detector array 508. The detector array 508 is one embodiment of the detector array 308 of FIG. 3. The detector array 508 comprises a plurality of non-imaging sensors, such as a plurality of dedicated sensors 510, and a plurality of imaging sensors 506 similar to the detector array of FIG. 4. The plurality of non-imaging sensors may be positioned proximate to an interface between the collimator assembly 306 and the detector array 508 along a height of the detector array, the height defined along the radial direction The plurality of dedicated sensors 510 may include a first dedicated sensor 510a, a second dedicated sensor 510b, a third dedicated sensor 510c, a fourth dedicated sensor 510d, and a fifth dedicated sensor 510e. The plurality of dedicated sensors 510 may perform focal spot tracking. The plurality of dedicated sensors 510 extend parallel from a bottom edge of the plurality of collimator plates and are aligned with the plurality of collimator plates 404. For example, each of the plurality of collimator plates 404 is aligned with one of the plurality of dedicated sensors 510. As shown in the sensor-embedded detector assembly 500, each dedicated sensor extends along an entire height of the detector array 508.

In contrast to FIG. 4, the second dedicated sensor 510b, the third dedicated sensor 510c, the fourth dedicated sensor 510d, and the fifth dedicated sensor 510e may be split sensors whereas the first dedicated sensor 510a is a non-split sensor. As such, each of the split sensors may include two sensors stacked horizontally (e.g., in a direction perpendicular to the radial direction 401). The split sensors may also perform focal spot tracking when the split sensor is a dedicated sensor, similar to non-split sensors. In particular, the split sensors may measure collimator plate alignment and focal motion sensitivity and perform signal correction. In other embodiments, the split sensors may be specialized sensors that measure temperature and humidity and convert output signals of the specialized sensors to electrical signals during signal processing.

Similar to FIG. 4, in some embodiments, the width of a dedicated sensor (e.g., split sensors and non-split sensors) may be equal to the width of the collimator plate to which the dedicated sensor is aligned with. In other embodiments, the width of the dedicated sensor may be less than the width of the collimator plate to which the dedicated sensor is aligned with. In alternate embodiments, the width of the dedicated sensor may be greater than the width of the collimator plate to which the dedicated sensor is aligned with.

Furthermore, a height of the plurality of dedicated sensors 510 (e.g., splits sensors and non-split sensors), the height defined along the radial direction 401, may be equal to a height of the detector array 508. However, in other examples, only a portion of the plurality of dedicated sensors 510 may extend along the entire height of the detector array 508. A remaining portion of the plurality of dedicated sensors 510 may extend partially along the height of the detector array 508. By integrating dedicated sensors that extend along the entire height of the detector array 508, signal correction may be performed by adding the dedicated sensor signal output to the imaging sensor channels.

The plurality of imaging sensors 506 may include a first imaging sensor 506a, a second imaging sensor 506b, a third imaging sensor 506c, and a fourth imaging sensor 506d. Signals output from the plurality of imaging sensors 506 may be processed to generate a medical image. The plurality of imaging sensors 506 extend parallel from the bottom edge of the plurality of spacers 402 and are aligned with the plurality of spacers. Each imaging sensor may be aligned with one of the spacers along the radial direction 401 and located between at least two dedicated sensors. As shown in the sensor-embedded detector assembly 500, each imaging sensor extends along an entire height of the detector array 508.

As illustrated in FIG. 6, a third example of a sensor-embedded detector assembly 600 comprises the collimator assembly 306 and the detector array 608. The detector array 608 is one embodiment of the detector array 308 of FIG. 3. The detector array 608 comprises a plurality of non-imaging sensors including a plurality of dedicated sensors 610 and a plurality of imaging sensors 606, similar to the detector arrays of FIGS. 4 and 5. The plurality of non-imaging sensors may be positioned proximate to an interface between the collimator assembly 306 and the detector array 608 along a height of the detector array, the height defined along the radial direction The plurality of dedicated sensors 610 may include a first dedicated sensor 610a, a second dedicated sensor 610b, a third dedicated sensor 610c, a fourth dedicated sensor 610d, and a fifth dedicated sensor 610e. The plurality of dedicated sensors 610 may perform focal spot tracking. The plurality of dedicated sensors 610 extend parallel from the bottom edge of the plurality of collimator plates 404 and are aligned with the plurality of collimator plates 404. For example, each of the plurality of collimator plates 404 is aligned with one of the plurality of dedicated sensors 610. As shown in FIG. 6, each dedicated sensor extends along a portion of a height of the detector array 608.

By incorporating dedicated sensors that do not extend along the entire height of the detector array 608, a width of at least a portion of the plurality of imaging sensors 606 positioned below the plurality of dedicated sensors 610 may be increased. By integrating dedicated sensors that extend along a portion of a height of the detector array 608, signal correction may be performed by adding the dedicated signal output to the imaging sensor channels while decreasing manufacturing costs and increasing cost effectiveness (e.g., due to reduced sensor height).

Similar to in FIGS. 4 and 5, in some embodiments, the width of a dedicated sensor may be equal to the width of the collimator plate to which the dedicated sensor is aligned with. In other embodiments, the width of the dedicated sensor may be less than the width of the collimator plate to which the dedicated sensor is aligned with. In alternate embodiments, the width of the dedicated sensor may be greater than the width of the collimator plate to which the dedicated sensor is aligned with.

The plurality of imaging sensors 606 may include a first imaging sensor 606a, a second imaging sensor 606b, a third imaging sensor 606c, and a fourth imaging sensor 606d. Signals output from the plurality of imaging sensors 606 may be processed to generate a medical image. The plurality of imaging sensors 606 extend parallel from the bottom edge of the plurality of spacers 402 and are aligned with the plurality of spacers. Each imaging sensor may be aligned with one of the spacers along the radial direction 401 and located between at least two dedicated sensors. As shown in the sensor-embedded detector assembly 600, each imaging sensor extends along an entire height of the detector array 608.

Turning now to FIG. 7, a fourth example of a sensor-embedded detector assembly 700 is depicted. The sensor-embedded detector assembly 700 comprises the collimator assembly 306 and the detector array 708. The detector array 708 is one embodiment of the detector array 308 of FIG. 3. The detector array 708 comprises a plurality of non-imaging sensors, such as a plurality of dedicated sensors 710 and a plurality of specialized sensors 712, and a plurality of imaging sensors 706, similar to the detector arrays of FIGS. 4, 5, and 6. The plurality of non-imaging sensors may be positioned proximate to an interface between the collimator assembly 306 and the detector array 708 along a height of the detector array, the height defined along the radial direction The plurality of dedicated sensors 710 may include a first dedicated sensor 710a, a second dedicated sensor 710b and the plurality of specialized sensors 712 may include a first specialized sensor 712a and a second specialized sensor 712b. The plurality of dedicated sensors 710 may enable focal spot tracking while the plurality of specialized sensors 712 may be specialized devices, such as electromechanical devices that monitor temperature and humidity, and perform strain-gauge measurements.

In some embodiments, an alignment of the plurality of dedicated sensors with the plurality of collimator plates may utilize non-uninform distribution of the plurality of dedicated sensors, where not all the collimator plates are aligned with one dedicated sensor. For example, when the sensor-embedded detector assembly is configured according to the example of FIG. 7, each dedicated sensor is aligned with one of the collimator plates but not all the collimator plates are aligned with one dedicated sensor. In other words, a quantity of the dedicated sensors may be less than a quantity of the collimator plates such that only a portion of the collimator plates have a dedicated sensor arranged below and aligned therewith. More specifically, first collimator plate 404a is aligned with the first dedicated sensor 710a and the fifth collimator plate 404e is aligned with the second dedicated sensor 710b. The remaining collimator plates, such as the second collimator plate 404b, the third collimator plate 404c, and the fourth collimator plate 404d, are not aligned with any dedicated sensors of the plurality of dedicated sensors. Other embodiments of non-uniform distribution of the plurality of dedicated sensors may differ. For example, the first subset of the plurality of dedicated sensors may include additional dedicated sensors that are aligned with one or more of the remaining collimator plates.

The plurality of dedicated sensors extend parallel from the bottom edge of the plurality of collimator plates and are aligned with the plurality of collimator plates. As shown in the sensor-embedded detector assembly 700, each dedicated sensor in the first subset of the plurality of dedicated sensors extends along a portion of a height of the detector array 708. Additionally, the plurality of specialized sensors extend parallel from the bottom edge of the plurality of dedicated sensors and are aligned with the plurality of dedicated sensors. Each specialized sensor in the plurality of specialized sensors may extend along the remaining portion of the height of the detector array 708. By integrating dedicated sensors and specialized sensors that extend along a portion of a height of the detector array 608, signal correction may be performed by adding the dedicated signal output to the imaging sensor channels while decreasing manufacturing costs and increasing cost effectiveness (e.g., due to reduced sensor height).

In other embodiments, the plurality of specialized sensors may not extend along the remaining portion of the height of the detector array 708. Instead, the plurality of specialized sensors may extend along a portion of the remaining portion of the height of the detector array 708. In further embodiments, the sensor-embedded detector assembly 700 may include additional dedicated sensors in the plurality of dedicated sensors or additional specialized sensors in the plurality of specialized sensors (e.g., not shown). The additional dedicated sensors or additional specialized sensors may extend parallel from the bottom edge of the plurality of specialized sensors and may be aligned with the plurality of specialized sensors. Each additional dedicated sensor in the plurality of dedicated sensors or additional specialized sensor in the plurality of specialized sensors may extend along the remaining portion or a portion of the remaining portion of the height of the detector array 708.

Similar to in FIGS. 4-6, in some embodiments, the width of a dedicated sensor may be equal to the width of the collimator plate to which the dedicated sensor is aligned with. In other embodiments, the width of the dedicated sensor may be less than the width of the collimator plate to which the dedicated sensor is aligned with. In alternate embodiments, the width of the dedicated sensor may be greater than the width of the collimator plate to which the dedicated sensor is aligned with.

Signals output from the plurality of imaging sensors 706 may be processed to generate a medical image. The plurality of imaging sensors 706 extend parallel from the bottom edge of the plurality of spacers 402 and are aligned with the plurality of spacers. Each imaging sensor may be aligned with one of the spacers along the radial direction 401 and located between at least two dedicated sensors. As shown in the sensor-embedded detector assembly 600, each imaging sensor extends along an entire height of the detector array 608.

It may be understood that the configurations of a sensor-embedded detector assembly discussed above are exemplary and do not limit the scope of the present disclosure. Other embodiments of the sensor-embedded detector assembly may utilize one or more components and features discussed above with regards to FIGS. 4-7, the one or more components and features being dedicated sensors of variable height, split sensors, different types of specialized sensors, non-uniformly distributed dedicated sensors and specialized sensors, and the like. Further, other embodiments may utilize additional or less components and features than discussed above with regards to FIGS. 4-7, such as additional collimator plates, as one example.

Turning to FIG. 8, an imaging system 800 is illustrated where the imaging system 800 includes an embodiment of the detector assembly 304 comprising a direct conversion detector array 820, such as a photon counting detector, and a collimator assembly 802. The collimator assembly 802 comprises a plurality of collimator plates 806, including a first collimator plate 806a, a second collimator plate 806b, and a third collimator plate 806c, which direct x-ray beams toward the direct conversion detector array 820 according to an impinging x-ray direction 804. Each collimator plate of the plurality of collimator plates 806 has a width of collimator plate width 826.

The direct conversion detector array 820 includes a plurality of imaging sensor channels 812 for a plurality of imaging sensors, including a first imaging sensor channel 812a, a second imaging sensor channel 812b, a third imaging sensor channel 812c, and a fourth imaging sensor channel 812d. The imaging sensor channels are imaging detector pixels that detect x-rays. The imaging detector pixels may be comprised of scintillator material or semi-conductors.

The plurality of imaging sensor channels 812 may have an imaging sensor channel width of 824. The direct conversion detector array 820 further includes a plurality of dedicated sensor channels 814 of a plurality of dedicated sensors, including a first dedicated sensor channel 814a and a second dedicated sensor channel 814b. Analog signals, such as an electromagnetic signal from the attenuated x-ray photon, produced by the plurality of imaging sensor channels 812 and the plurality of dedicated sensor channels 814 may be transmitted to a data acquisition system (DAS) 818 via plurality of read-out connections 816.

The plurality of read-out connections 816 include a first read-out connection 816a, a second read-out connection 816b, a third read-out connection 816c, a fourth read-out connection 816d, a fifth read-out connection 816e, and a sixth read-out connection 816f. In some embodiments, the first read-out connection 816a may transmit an analog signal from the first imaging sensor channel 812a to the DAS 818. The second read-out connection 816b may transmit an analog signal from the second imaging sensor channel 812b to the DAS 818. The third read-out connection 816c may transmit an analog signal from the first dedicated sensor channel 814a to the DAS 818. The fourth read-out connection 816d may transmit an analog signal from the second dedicated sensor channel 814b to the DAS 818. The fifth read-out connection 816e may transmit an analog signal from the third imaging sensor channel 812c to the DAS 818. The sixth read-out connection 816f may transmit an analog signal from the fourth imaging sensor channel 812d to the DAS 818.

The plurality of collimator plates 806 is aligned with gaps located between imaging sensor channels of the plurality of imaging sensor channels 812. As one example, the first collimator plate is aligned with a gap 807 located between the first imaging sensor channel 812a and the second imaging sensor channel 812b. In some embodiments, the plurality of imaging sensor channels 812 may be the plurality of imaging sensor channels described above with respect to FIGS. 4-7.

Since the plurality of collimator plates 806 shadow or block impinging x-ray beams from reaching the plurality of imaging sensor channels 812, a signal loss may be experienced. Additionally, the gaps (e.g., gap 807), which contain charge shared measured protons, may be poor signal regions. As a result, signal reduction due to shadowing (e.g., shadowing occurring below the collimator plates 806) and the gaps may degrade the final signal. For example, primary signals that are more useful towards increasing image quality than signals that produce charge sharing counts may be blocked by the collimators plates. The signals that produce charge sharing counts may originate from other regions of the sensor, such as the pixel gaps. By inhibiting reduction of the primary signals, such as by placing the collimator plate shadow over the region regions that generate charge sharing counts, image quality may be increased. By increasing the gap width, a more effective measured energy spectrum may be available and may result in a reduction of electronic noise.

Accordingly, a layout and pitch of the plurality of imaging sensor channels 812, are spaced in a specific manner to reduce the active area of at least some of the plurality of imaging sensors and correspondingly increase gap width, e.g., relative to gap width 808. By reducing the active area and increasing the gap width 808 at certain regions of the direct conversion detector array 820, capacitive coupling and leakage between the imaging sensor channels may be reduced, reducing electronic noise of gaps. The gap width may be determined according to the following equation:

$$w_{gap} = w_{plate} + F_{charge\,sharing} \quad (1)$$

where $w_{plate}$ is a collimator plate width 826, $F_{charge\,sharing}$ is a charge sharing reducing factor, and $w_{gap}$ is gap width 808. The additional charge sharing reducing factor provides a wider separation between electrodes and is based on sensor design. The charge sharing reducing factor incorporates a modifier to reduce charge sharing events, determined empirically or through modelling, to optimize the effects of blocked regions under the collimator plates. The charge sharing reducing factor may be positive, zero, or negative, depending on design.

Since shadowing due to the plurality of collimator plates 806 affects signal output from the plurality of imaging sensors, detector performance efficiency relies on a target alignment of the plurality of collimator plates 806. Alignment of the plurality of collimator plates 806 according to the target alignment may be ensured by setting tolerances based on components and features of the detector system that may be used to adjust the components.

In the direct conversion detector array 820, the first dedicated sensor channel 814a and the second dedicated sensor channel 814b are shaped and positioned to be proximate to the second collimator plate 806b where the shadowing caused by the second collimator plate 806b occurs. The combined widths of the of the first dedicated sensor channel 814a and the second dedicated sensor channel 814b may be at least as wide as the collimator plate width 826 and may further be wide enough to encompass a largest shadow footprint produced from tilting of the second collimator plate 806b based on manufacturing capability, focal spot motion, and deflection of the second collimator plate 806b from thermal and rotational forces. In other embodiments of the present disclosure, similar dedicated sensor channels may be positioned between one of each imaging sensor in the plurality of imaging sensors and multiple imaging sensors at pre-determined intervals. Similarly, the combined dedicated sensor channel widths 810 may be selected to be at least a wide as a sum of the width one of the plurality of collimator plates and the corresponding shadow footprint. As one example, the dedicated sensor channel width 810 may be less than the imaging sensor channel width 824 (e.g., $w_{plate} < 2 \cdot w_S$) and the collimator plate width 826 may be less than twice the width of the dedicated sensor channel width (e.g., $w_S < w_D$).

Turning now to FIG. 9, an imaging system 900 is illustrated where the imaging system 900 includes an embodiment of the detector assembly 304 comprising an indirect conversion detector array 924, such as an energy integrating detector, and a collimator assembly 902. The collimator assembly 902 comprises a plurality of collimator plates 906, including a first collimator plate 906a, a second collimator plate 906b, and a third collimator plate 906c, which direct x-ray beams toward the indirect conversion detector array 924 according to an impinging x-ray direction 904. Each collimator plate of the plurality of collimator plates 906 has a width of plate width 926.

The indirect conversion detector array 924 includes a plurality of active scintillator sensor channels 912 for a plurality of active scintillator pixels, where the pixels may be analogous to the imaging sensors described above. The plurality of active scintillator sensor channels 912 includes a first active scintillator sensor channel 912a, a second active scintillator sensor channel 912b, a third active scintillator sensor channel 912c, and a fourth active scintillator sensor channel 912d. The plurality of active scintillator sensors may convert an x-ray photon to a lower energy electromagnetic (EM) photon, such as visible light. The lower energy electromagnetic (EM) photon may be collected as a charge/current proportional to an x-ray intensity. The plurality of active scintillator sensor channel 912 may have an active scintillator sensor channel width of 924. The indirect conversion detector array 924 further includes a plurality of dedicated sensor channels 914 of a plurality of dedicated sensors, such as a first dedicated sensor channel 914a and a second dedicated sensor channel 914b.

The plurality of dedicated sensor channel 914 and the plurality of active scintillator channel may be communicatively coupled to a plurality of read-out light detecting diodes 918, which collects light signals, such as the lower energy EM photon. The plurality of read-out light detecting diodes 918 may include a first read-out light detection diode 918a, a second read-out light detecting diode 918b, a third read-out light detecting diode 918c, a fourth read-out light detecting diode 918d, a fifth read-out light detecting diode 918e, and a sixth read-out light detecting diode 918f.

For example, the first active scintillator sensor channel 912a may be communicatively coupled to the first read-out light detecting diode 918a. The second active scintillator sensor channel 912b may be communicatively coupled to the second read-out light detecting diode 918b. The first dedicated sensor channel 914a may be communicatively coupled to the third read-out light detecting diode 918c. The second dedicated sensor channel 914 may be communicatively coupled to the fourth read-out light detecting diode 918d. The third active scintillator sensor channel 912c may be communicatively coupled to the fifth read-out light detecting diode 918e. The fourth active scintillator sensor channel 912d may be communicatively coupled to the sixth read-out light detecting diode 918f.

Analog signals, such as the lower energy EM photon, produced by the plurality of read-out light detecting diodes 918 may be transmitted to a data acquisition system (DAS) 922 via plurality of read-out connections 920. The plurality of read-out connections 920 include a first read-out connection 920a, a second read-out connection 920b, a third read-out connection 920c, a fourth read-out connection 920d, a fifth read-out connection 920e, and a sixth read-out connection 920f.

In some embodiments, the first read-out connection 920a may transmit an analog signal from the first read-out light detecting diode 918a to the DAS 922. The second read-out connection 920b may transmit an analog signal from the second read-out light detecting diode 918b to the DAS 922. The third read-out connection 920c may transmit an analog signal from the third read-out light detecting diode 918c to the DAS 922. The fourth read-out connection 920d may transmit an analog signal from the fourth read-out light detecting diode 918d to the DAS 922. The fifth read-out connection 920e may transmit an analog signal from the fifth read-out light detecting diode 918e to the DAS 922. The sixth read-out connection 920f may transmit an analog signal from the sixth read-out light detecting diode 918f to the DAS 922.

The plurality of collimator plates 906 is aligned with gaps located between active scintillator sensor channel of the plurality of active scintillator sensor channel 912. As one example, the first collimator plate is aligned with a gap 907 located between the first active scintillator sensor channel 912a and the second active scintillator sensor channel 912b.

Since the plurality of collimator plates 906 shadow or block impinging x-ray beams from reaching the plurality of active scintillator sensor channel 912, a signal loss may be experienced. Additionally, the gaps (e.g., gap 907), which contains charge shared measured protons, may be poor signal regions. As a result, signal reduction due to shadowing and gaps may adversely affect the final signal. By increasing gap width for at least some regions of the indirect conversion detector array 924, a more effective measured energy spectrum may be available and may result in a reduction of electronic noise.

Accordingly, a layout and pitch of the plurality of active scintillator sensor channels 912, are spaced in a specific manner to reduce the active scintillator area of the plurality of imaging scintillator sensors and increase gap width, such as gap width 908. By reducing the active scintillator area and increasing the gap width 908, crosstalk between the imaging scintillator sensor channels may be reduced, decreasing errant signal bias between scintillator pixels. Similar the example of FIG. 8, gap width may be leveraged in a scintillator-based detector assembly. However, instead of incorporating a charge sharing reducing factor, gap width may be optimized based on efficiency losses and performance sensitivities of the detector system. The gap width may be configured to be wide enough to hide the edges of the scintillator pixel under the detector collimator blades, preventing spectral sensitivities from x-ray paths that pass through the scintillator pixel side wall. Optimization of gap width may also account for scintillator and detector collimator tolerances during manufacturing.

Since shadowing due to the plurality of collimator plates 906 affects output signals from the plurality of imaging sensors, detector performance efficiency relies on a target alignment of the plurality of collimator plates 906. Alignment of the plurality of collimator plates 906 according to the target alignment may be ensured by setting tolerances based on components and features of the detector system that may be used to adjust the components.

In the indirect conversion detector array 924, the first dedicated sensor channels 914a and the second dedicated sensor channel 914b are shaped and positioned to be proximate to the second collimator plate 206b where the corresponding shadowing caused by the second collimator plate 206b is located. The combined widths of the first dedicated sensor channels 914a and the second dedicated sensor channel 914b is at least as wide as a sum of the collimator plate width 926 and a largest shadow produced from tilting of the second collimator plate 906b based on manufacturing capability, focal spot motion, and deflection of the second collimator plate 906b from thermal and rotational forces.

In other embodiments of the present disclosure, similar dedicated sensor channels may be positioned between one of each imaging sensor in the plurality of imaging sensors and multiple imaging sensors at pre-determined intervals. Similarly, the combined widths of the dedicated sensor channels may be at least as wide as one of the plurality of collimator plates plus its shadow footprint. As one example, the dedicated sensor channel width 910 may be less than the imaging sensor channels width 916 (e.g., $w_{plate} < 2 \cdot w_S$) and the collimator plate width 926 may be less than twice the width of the dedicated sensor channel width (e.g., $w_S < w_D$).

As shown in FIG. 10, circuitry 1000 transmits analog signals from a detector assembly to a signal converting device, such as a data acquisition system (DAS) or application specific integrated circuit (ASIC) 1002. In particular, the circuitry 1000 is integrated with the detector assembly 304 of FIG. 8, as illustrated. However, in other embodiments of the present disclosure, the circuitry 1000 may be integrated with various embodiments of the detector assembly described herein with respect to FIGS. 4-9 without departing from the scope of the present disclosure.

The ASIC 1002 is communicatively coupled to the detector assembly 304 via a plurality of read-out connections (not shown) and to an image reconstructor 1012 via a communication bus 1010, which may be the image reconstructor described above with respect to FIG. 2. In this way, analog signals output from either a plurality of imaging sensors, a plurality of read-out light detecting diodes, a plurality of dedicated sensors, or a plurality of specialized sensors may be transmitted to the ASIC 1002 where the analog signals are then converted to digital signals that may be processed to generate medical images via the reconstructor 1012. The analog signals may be filtered and converted to digital signals by the circuitry 1000.

The circuitry 1000 comprises a plurality of traces for a first integrated circuitry (IC) 1004 for an imaging sensor and a second integrated circuit (IC) 1006 for a dedicated sensor (or specialized sensor), a plurality of transistor or amplifier-based circuits, a plurality of capacitors, a plurality of comparators and an analog-to-digital (ADC) chip 1008. In some embodiments, the trace material of the plurality of traces may be deposited on the imaging sensor and dedicated sensor (or specialized sensor) via wire bonds or via flexible trace material bonded to the imaging sensor and dedicated sensor (or specialized sensor) at specific contact points or bond pads.

Turning to the first IC 1004 for the imaging sensor, the first IC 1004 includes a first transistor or amplifier-based circuit 1004a, the first transistor or amplifier-based circuit 1004a comprising a capacitor C1 and a comparator U1, in addition to the plurality of comparators, such as comparator U2, U3, and U4. A signal current of the analog signal of the imaging sensor is directed to the transistor or amplifier-based circuitry 1004a via the plurality of traces, where the analog signal is filtered and integrated. The signal current of the analog signal is directed toward a plurality of comparators (e.g., comparators U2, U3, and U4) with different photon energies or signal ranges. Accordingly, the signal current and analog signal is split based on the different photon energies or signal ranges of comparators U2, U3, and U4, and a signal current of an analog signal for each signal range is directed to the ADC chip 1008 via the plurality of traces, where the analog signal for each signal range is converted to a digital signal.

Now, turning to the second IC for the dedicated sensor (or specialized sensor), the second IC 1006 includes a second transistor or amplifier-based circuit 1006a, the second transistor or amplifier-based circuit 1006a comprising a capacitor C2 and a comparator U5, in addition to comparator U6. A signal current of the analog signal of the imaging sensor is directed to the transistor or amplifier-based circuitry 1004a via the plurality of traces, where the analog signal of the dedicated sensor (specialized sensor) is filtered and integrated. The signal current of the analog signal is directed toward comparator U6 where the analog signal of the dedicated sensor (specialized sensor) is further filtered and integrated before being directed to the ADC chip 1008 via the plurality of traces, where the analog signal is converted to a digital signal.

It may be understood that circuitry 1000 is exemplary and does not limit the scope of the present disclosure. In some embodiments, the circuitry 1000 may include fewer or additional components than described herein. In alternate embodiments, the circuitry 1000 may include the same or different components than described herein.

FIG. 11 shows a method 1100 for determining an alignment of a plurality of collimator plates in a detector assembly, such as the detector assembly 304. In one embodiment, the method 1100 is performed by the CT imaging system 100 of FIG. 1, and the detector assembly may be an embodiment of a detector assembly described with regards to FIGS. 4-9. As such, the method 1100 is described with respect to the system and components described above with respect to FIGS. 1-9 but may be carried out with other systems/components without departing from the scope of this disclosure.

The method 1100 and the remaining methods included herein may be executed by a processor (e.g., the processor 110 of FIG. 1) according to instructions stored in non-transitory memory (e.g., the non-transitory memory of a computing device, such as an imaging system). Although the method 1100 will be described with respect to an embodiment wherein the detector assembly integrates a direct conversion detector array similar to FIG. 8, the method 1100 may be performed with detector assembly may integrate an indirect conversion detector array similar to FIG. 9.

At 1102, the method 1100 includes converting impinging x-rays received at each imaging sensor into electrical signals. As described herein, a plurality of collimator plates of a collimator assembly in a detector assembly may direct attenuated x-ray photons in an x-ray impinging direction through a plurality of spacers toward a plurality of sensors of a detector array. The plurality of sensors may include a plurality of imaging sensors. When an x-ray photon impinges toward an imaging sensor, an analog signal is produced by the imaging sensor and transmitted to a data acquisition system. In some embodiments, where a direct conversion detector array is integrated into the detector assembly, the plurality of imaging sensors may directly convert the x-ray photon into an analog signal, as shown in FIG. 8. The analog signal may be converted to an electrical signal by circuitry in a DAS. In some embodiments, the circuitry may be the circuitry 1000 of FIG. 10.

However, in some embodiments, where an indirect conversion detector array is integrated into the detector assembly, the plurality of imaging sensors may convert the x-ray photon to a lower energy electromagnetic (EM) photons (e.g., a visible light photon). A plurality of read-out light detecting diodes may convert impinging lower energy EM photons into analog signals, as shown in FIG. 9. The analog signal may be converted to an electrical signal by circuitry in a DAS. In some embodiments, the circuitry may be the circuitry 1000 of FIG. 10.

At 1104, the method 1100 includes converting data received at each non-imaging sensor into electrical signals. For example, the dedicated sensors may receive focal spot information and the specialized sensors may receive temperature and humidity information. In other embodiments, the dedicated sensors or specialized sensors may receive other types of information, such as strain-gauge measurement.

At 1106, the method 1100 includes determining alignment of collimator plate based on electrical signals from the non-imaging sensors. The alignment of a collimator plate relative to a channel of a dedicated sensor (or specialized sensor) may be determined according to a difference formula of measured signals of channels for dedicated sensors (or specialized sensors). Alignment of the collimator plate may be determined according to the following equation:

$$F(\text{Alignment}) = \frac{S_n - S_{n+1}}{S_n + S_{n+1}} \qquad (2)$$

where $S_n$ is a digital signal of a first dedicated sensor (or specialized sensor) and $S_{n+1}$ is a digital signal of a second dedicated sensor (or specialized sensor) positioned proximate to the first dedicated sensor. The difference formula of measured signals may determine the alignment of the collimator plate relative to a target alignment, where a value at 0 indicates the shadow is centered about a centerline of the channel gap, a positive value would indicate a positive shift in x of the shadow from the centerline of the channel gap, and a negative value would indicate negative shift in x of the shadow from the centerline of the channel gap. The actual values measured would be dependent on actual dimensions of the collimator plates of the collimator assembly and could be characterized by models of empirical measurements.

In other words, the ratio of the difference between output signals of adjacent dedicated sensors or adjacent specialized sensors and the sum of the adjacent dedicated sensors or adjacent specialized sensors (e.g., F(alignment)) being equal to zero indicates that the target alignment of the collimator plate is achieved, being equal to a positive value indicates that the alignment is offset in a positive x-direction, and being equal to a negative value indicates that the alignment is offset in a negative x-direction, where an x-direction is orthogonal to the collimator plate At 1108, the method 1100 includes correcting electrical signals from imaging sensors based on alignment of collimator plate. The data of signals Sn and Sn+1 can be added or subtracted into the channels Dn and Dn+1, respectively, after being used to determine collimator behaviors and can be corrected for to homogenize the signal of the channel with a desired alignment. In particular, the signals Sn and Sn+1 may be added or subtracted from channels Dn and Dn+1 based on whether the collimator plate is experiencing a positive shift or negative shift from the target alignment of the collimator plate. In this way, a correction may be applied prior to scanning a patient, reducing image artifacts in the generated medical image. The method 1100 then ends.

FIG. 12 shows a method 1200 for correcting focal motion in a detector assembly, such as the detector assembly 304. In one embodiment, the method 1200 is performed by the CT imaging system 100 of FIG. 1, and the detector assembly may be an embodiment of a detector assembly described with regards to FIGS. 4-9. As such, the method 1200 is described with respect to the system and components described above with respect to FIGS. 1-9 but may be carried out with other systems/components without departing from the scope of this disclosure.

The method 1200 and the remaining methods included herein may be executed by a processor (e.g., the processor 110 of FIG. 1) according to instructions stored in non-transitory memory (e.g., the non-transitory memory of a computing device, such as an imaging system). Although the method 1200 will be described with respect to an embodiment where the detector assembly integrates a direct conversion detector array similar to FIG. 8, the method 1200 may be performed with a detector assembly having an indirect conversion detector array, as shown in FIG. 9.

At 1202, the method 1200 includes converting impinging x-rays received at each imaging sensor into electrical signals. Similar to the method 1100 of FIG. 11, a plurality of collimator plates of a collimator assembly in the detector assembly may direct attenuated x-ray photons along an x-ray impinging direction. For example, the photons may pass through a plurality of spacers of the collimator assembly toward a plurality of sensors of the detector array, producing an analog signal. When the direct conversion detector array is integrated into the detector assembly (e.g., FIG. 8), the analog signal is transmitted to a data acquisition system where the analog signal may be converted to an electrical signal by circuitry in a DAS. In some embodiments, the circuitry may be the circuitry 1000 of FIG. 10.

However, in some embodiments, such as when the indirect conversion detector array is integrated into the detector assembly (e.g., FIG. 9), the plurality of imaging sensors may convert the x-ray photon to lower energy electromagnetic (EM) photons). A plurality of read-out light detecting diodes may convert impinging lower energy EM photons into analog signals. The analog signal may be converted to an electrical signal by circuitry in a DAS. In some embodiments, the circuitry may be the circuitry 1000 of FIG. 10.

At 1204, the method 1200 includes converting data received at each non-imaging sensor into electrical signals. For example, the dedicated sensors may receive focal spot information and the specialized sensors may receive temperature and humidity information. In other embodiments, the dedicated sensors or specialized sensors may receive other types of information, such as strain-gauge measurement.

At 1206, the method 1200 includes correcting signals from imaging sensors based on electrical signals from non-imaging sensors. Due to thermal motion, rotational motion, and x-ray focal spot drift over time, signal efficiency may be reduced as a result of changes in positioning of a plurality of collimator plates in a collimator assembly. When the plurality of collimator plates is close to the target alignment of the plurality of collimator plates, focal motion may be corrected.

In the case where a collimator plate is positioned in a position close to the target alignment, a relative formula for measured signals of a channel of a dedicated sensor (or specialized sensor) may be characterized as a linear or polynomial function and may be implemented to estimate focal spot location. Focal spot may be estimated according to the following equation:

$$fsx_{est} = A_1 \cdot \left(\frac{S_{n+1}}{S_n}\right)^2 + A2 \cdot \left(\frac{S_{n+1}}{S_n}\right) + B \qquad (3)$$

where $S_{n+1}$ and $S_n$ are electrical signals of pixels at a position distance along x, $fsx_{est}$ is an estimation of a location of the focal spot, $A_1$, $A_2$, and $B_1$ are fitting coefficients of the function. Other polynomial fits may be used to estimate the location of the focal spot depending on dimensional choices of the collimator assembly and detector array. The coefficients may be determined through models if a variation of the system is minimal or through a calibration process, which detects the focal spot. Focal motion correction for channels of the imaging sensors may be performed when focal spot when a position in x is known. Focal motion may be performed according to the following equation:

$$D_{n, corrected} = D_{n, current} \cdot \left(C_1 \cdot (fsx_{est})^2 + C2 \cdot (fsx_{est}) + D\right) \qquad (4)$$

where $D_n$ is an electrical signal of any pixel corrected with electrical signals from dedicated sensors or specialized sensors, and $C_1$, $C_2$, and D are fitting coefficients of the function. Other polynomial fits may be used to estimate the corrected imaging sensor signal depending on dimensional choices. The coefficients may be determined through models if variation of system is minimal or through a calibration process, which detects the focal spot. Further, the fitting coefficients may be determined based on the type of dedicated sensor or specialized sensor as well as dimensions of the dedicated sensor or specialized sensor. The method 1200 then ends.

By correcting output signals of a plurality of imaging sensors based on output signals received from a plurality of non-imaging sensors, such as a plurality of dedicated sensors that perform focal spot tracking and a plurality of specialized sensors that monitor temperature, humidity, and perform strain-gauge measurements according to the methods described above with FIGS. 11 and 12, scattering of x-ray photons may be reduced by integrating detector array configurations described herein with respect to FIGS. 3-10, which in turn, may reduce cross talk. Similarly, due to the reduction of scattering of x-ray photons, figure of merit may be increased due to a reduction in scatter to primary ratio (SPR). In turn, the contrast to noise ratio of an imaging system may be increased, which may increase the quality of images generated by the imaging system. Further, the scattering of x-ray photons may be reduced due to strategic placement of the non-imaging sensors.

The technical effect of integrating a plurality of imaging sensors and a plurality of non-imaging sensors, such as a plurality of dedicated sensors and a plurality of specialized sensors, includes reducing scattering of x-ray photons, which in turns reduces cross talk and increases the quality of medical images generated by an imaging system.

The disclosure also provides support for a detector array, comprising: a collimator assembly arranged between the detector array of a detector assembly and an x-ray source, the collimator assembly having a plurality of post-patient collimator plates aligned substantially parallel with a radial direction of an imaging system, a plurality of imaging sensors located in the detector array, and a plurality of non-imaging sensors located in spaces between the plurality of imaging sensors, the spaces aligned with a plurality of collimator plates. In a first example of the system, the plurality of non-imaging sensors extend along an entire height of the detector array. In a second example of the system, optionally including the first example, the plurality of non-imaging sensors extend along a portion of a height of the detector array.

In a third example of the system, optionally including one or both of the first and second examples, a width of one of the plurality of non-imaging sensors is equal to or less than a width of the one of the plurality of collimator plates to which a non-imaging sensor is aligned with. In a fourth example of the system, optionally including one or more or each of the first through third examples, more than one of the plurality of non-imaging sensors is aligned with one collimator plate of the plurality of collimator plates. In a fifth example of the system, optionally including one or more or each of the first through fourth examples, the plurality of non-imaging sensors is positioned proximate to an interface between the collimator assembly and the detector array along a height of the detector array, the height defined along the radial direction.

In a sixth example of the system, optionally including one or more or each of the first through fifth examples, each collimator plate of the plurality of collimator plates is aligned with one non-imaging sensor of the plurality of non-imaging sensors. In a seventh example of the system, optionally including one or more or each of the first through sixth examples, a quantity of the plurality of non-imaging sensors is less than a quantity of the plurality of collimator plates. In an eighth example of the system, optionally including one or more or each of the first through seventh examples, the plurality of imaging sensors includes imaging sensors, and wherein the plurality of non-imaging sensors includes dedicated sensors for focal spot tracking, and specialized sensors for one or more of temperature sensors, humidity sensors, and strain-gauge measurement sensors.

The disclosure also provides support for a method, comprising: correcting an imaging sensor signal from an imaging sensor of a detector array based on a signal output from a non-imaging sensor of the detector array to correct for focal motion, and correcting the imaging sensor signal based on the signal output from the non-imaging sensor to achieve a target alignment of a collimator plate of a collimator assembly of a detector assembly. In a first example of the method, correcting the imaging sensor signal based on the signal output from the non-imaging sensor for the imaging sensor to correct for focal motion comprises: estimating location of a focal spot based on a linear or polynomial function where the linear or polynomial function is dependent on a ratio of a pixel signal at a first location and a pixel signal at a second location shifted in an x-direction from the first location, and adjusting the imaging sensor signal based on a product of the imaging sensor signal and the linear or polynomial function, wherein the linear or polynomial function is dependent on an estimated location of the focal spot.

In a second example of the method, optionally including the first example, fitting coefficients for the linear or polynomial function used to estimate location of the focal spot and the linear or polynomial function used to adjust the imaging sensor signal is determined by one of a model that determines location of the focal spot when system variation is minimal or a calibration process of a system that detects location of the focal spot. In a third example of the method, optionally including one or both of the first and second examples, correcting the imaging sensor signal based on the signal output from the non-imaging sensor to achieve the target alignment of the collimator plate of the collimator assembly of the detector assembly comprises: determining a current alignment of the collimator plate via a ratio of a difference between output signals of adjacent dedicated sensors or adjacent specialized sensors and a sum of the adjacent dedicated sensors or adjacent specialized sensors, and adjusting an output signal of the imaging sensor based on the current alignment of the collimator plate.

In a fourth example of the method, optionally including one or more or each of the first through third examples, the ratio of the difference between output signals of adjacent dedicated sensors or adjacent specialized sensors and the sum of the adjacent dedicated sensors or adjacent specialized sensors being equal to zero indicates that the target alignment of the collimator plate is achieved, being equal to a positive value indicates that an alignment is offset in a positive x-direction, and being equal to a negative value indicates that the alignment is offset in a negative x-direction, where an x-direction is orthogonal to the collimator plate. In a fifth example of the method, optionally including one or more or each of the first through fourth examples, adjusting the output signal of the imaging sensor based on the current alignment of the collimator plate comprises: adding the output signal of the non-imaging sensor to the output signal of an imaging sensor channel based on whether the alignment is offset in the positive x-direction or the negative x-direction, and subtracting the output signal of the non-imaging sensor to an output signal of the imaging sensor channel based on whether the alignment is offset in the positive x-direction or the negative x-direction.

The disclosure also provides support for an x-ray imaging system, comprising: an x-ray source positioned on one side of a subject to be imaged, a detector assembly arranged opposite of the x-ray source on an opposite side of the subject, the detector assembly comprising: a detector array having a plurality of imaging sensors arranged in columns with spaces between the columns, a collimator assembly positioned adjacent to the detector array, the collimator assembly including a plurality of post-patient collimator plates extending away from a face of the detector array, perpendicular to the face of the detector array, and aligned with the spaces between the columns of the plurality of imaging sensors, a plurality of non-imaging sensors positioned in the spaces between the columns of the plurality of imaging sensors, and a computing device comprising a processor and executable instructions stored in non-transitory memory that, when executed, cause the processor to correct an output signal of the plurality of imaging sensors based on an output of the plurality of non-imaging sensors.

In a first example of the system, a pitch of an imaging sensor relative to other imaging sensors differs based on a placement of a plurality of dedicated sensors or a plurality of specialized sensors of the plurality of non-imaging sensors. In a second example of the system, optionally including the first example, the detector array is a direct conversion detector array or an indirect conversion detector array. In a third example of the system, optionally including one or both of the first and second examples, the system further comprises: a signal converting device, the signal converting device being a data acquisition system or an application-specific integrated circuit (ASIC), and wherein designated circuits in the signal converting device filter, integrate, and split output signals from a plurality of imaging sensor signals separately from a plurality of dedicated sensors and a plurality of specialized sensors.

In a fourth example of the system, optionally including one or more or each of the first through third examples, output signals of the plurality of imaging sensors are processed to generate a medical image, output signals of dedicated sensors of the plurality of non-imaging sensors are processed to detect a focal spot location, and output signals of specialized sensors of the plurality of non-imaging sensors are processed to monitor temperature, humidity, and strain-gauge measurements.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A detector array, comprising:
   a collimator assembly arranged between the detector array of a detector assembly and an x-ray source, the collimator assembly having a plurality of collimator plates aligned substantially parallel with a radial direction of an imaging system;
   a plurality of imaging sensors located in the detector array; and
   a plurality of non-imaging sensors located in spaces between the plurality of imaging sensors, wherein the spaces are aligned with the plurality of collimator plates and the plurality of non-imaging sensors includes dedicated sensors for focal spot tracking, and specialized sensors for one or more of temperature sensing, humidity sensing, and strain-gauge measurement sensing.

2. The detector array of claim 1, wherein the plurality of non-imaging sensors extend along an entire height of the detector array.

3. The detector array of claim 1, wherein the plurality of non-imaging sensors extend along a portion of a height of the detector array.

4. The detector array of claim 1, wherein a width of one of the plurality of non-imaging sensors is equal to or less than a width of the one of the plurality of collimator plates to which a non-imaging sensor is aligned with.

5. The detector array of claim 1, wherein more than one of the plurality of non-imaging sensors is aligned with one collimator plate of the plurality of collimator plates.

6. The detector array of claim 1, wherein the plurality of non-imaging sensors is positioned proximate to an interface between the collimator assembly and the detector array along a height of the detector array, the height defined along the radial direction.

7. The detector array of claim 1, wherein each collimator plate of the plurality of collimator plates is aligned with one non-imaging sensor of the plurality of non-imaging sensors.

8. The detector array of claim 1, wherein a quantity of the plurality of non-imaging sensors is less than a quantity of the plurality of collimator plates.

9. The detector array of claim 1, wherein the plurality of non-imaging sensors includes a dedicated sensor that extends parallel from a bottom edge of, and aligned with, a collimator plate of the plurality of collimator plates, and a specialized sensor that extends parallel from a bottom edge of, and aligned with, the dedicated sensor.

10. A method, comprising:
    correcting an imaging sensor signal from an imaging sensor of a detector array based on a signal output from a non-imaging sensor of the detector array to correct for focal motion, wherein the non-imaging sensor is configured as a dedicated sensor for focal spot tracking, and wherein the signal output from the dedicated sensor includes one or more of a focal motion sensitivity and a collimator plate alignment measurement; and
    correcting the imaging sensor signal based on the signal output from the non-imaging sensor to achieve a target alignment of a collimator plate of a collimator assembly of a detector assembly by adding the signal of the dedicated sensor into a channel of the imaging sensor when the collimator plate is experiencing a positive shift from the target alignment of the collimator plate, and subtracting the signal of the dedicated sensor from the channel of the imaging sensor when the collimator plate is experiencing a negative shift from the target alignment of the collimator plate.

11. The method of claim 10, wherein correcting the imaging sensor signal based on the signal output from the non-imaging sensor for the imaging sensor to correct for focal motion comprises:
    estimating location of a focal spot based on a linear or polynomial function where the linear or polynomial function is dependent on a ratio of a pixel signal at a first location and a pixel signal at a second location shifted in an x-direction from the first location; and
    adjusting the imaging sensor signal based on a product of the imaging sensor signal and the linear or polynomial function, wherein the linear or polynomial function is dependent on an estimated location of the focal spot.

12. The method of claim 11, wherein fitting coefficients for the linear or polynomial function used to estimate location of the focal spot and the linear or polynomial function used to adjust the imaging sensor signal is determined by one of a model that determines location of the focal spot when system variation is minimal or a calibration process of a system that detects location of the focal spot.

13. The method of claim 10, wherein correcting the imaging sensor signal based on the signal output from the non-imaging sensor to achieve the target alignment of the collimator plate of the collimator assembly of the detector assembly comprises:
    determining a current alignment of the collimator plate via a ratio of a difference between output signals of adjacent dedicated sensors or adjacent specialized sensors and a sum of the adjacent dedicated sensors or adjacent specialized sensors; and adjusting an output signal of the imaging sensor based on the current alignment of the collimator plate.

14. The method of claim 13, wherein the ratio of the difference between output signals of adjacent dedicated sensors or adjacent specialized sensors and the sum of the adjacent dedicated sensors or adjacent specialized sensors being equal to zero indicates that the target alignment of the collimator plate is achieved, being equal to a positive value indicates that an alignment is offset in a positive x-direction, and being equal to a negative value indicates that the alignment is offset in a negative x-direction, where an x-direction is orthogonal to the collimator plate.

15. The method of claim 14, wherein adjusting the output signal of the imaging sensor based on the current alignment of the collimator plate comprises:

adding the output signal of the non-imaging sensor to the output signal of an imaging sensor channel based on whether the alignment is offset in the positive x-direction or the negative x-direction; and subtracting the output signal of the non-imaging sensor to an output signal of the imaging sensor channel based on whether the alignment is offset in the positive x-direction or the negative x-direction.

16. An x-ray imaging system, comprising:

an x-ray source positioned on one side of a subject to be imaged;

a detector assembly arranged opposite of the x-ray source on an opposite side of the subject, the detector assembly comprising:

a detector array having a plurality of imaging sensors arranged in columns with spaces between the columns;

a collimator assembly positioned adjacent to the detector array, the collimator assembly including a plurality of post-patient collimator plates extending away from a face of the detector array, perpendicular to the face of the detector array, and aligned with the spaces between the columns of the plurality of imaging sensors;

a plurality of non-imaging sensors positioned in at least one of the spaces between the columns of the plurality of imaging sensors, wherein the plurality of non-imaging sensors includes dedicated sensors for focal spot tracking that extend parallel from a bottom edge of, and aligned with, a collimator plate of the plurality of collimator plates, and specialized sensors for one or more of temperature sensing, humidity sensing, and strain-gauge measurement sensing that extend parallel from a bottom edge of, and aligned with, the dedicated sensor;

at least one gap between imaging sensor channels; and a computing device comprising a processor and executable instructions stored in non-transitory memory that, when executed, cause the processor to correct an output signal of the plurality of imaging sensors based on an output of the plurality of non-imaging sensors.

17. The x-ray imaging system of claim 16, wherein a pitch of an imaging sensor relative to other imaging sensors differs based on a placement of a plurality of dedicated sensors or a plurality of specialized sensors of the plurality of non-imaging sensors.

18. The x-ray imaging system of claim 16, wherein the detector array is a direct conversion detector array or an indirect conversion detector array.

19. The x-ray imaging system of claim 16, further comprising a signal converting device, the signal converting device being a data acquisition system or an application-specific integrated circuit (ASIC), and wherein designated circuits in the signal converting device filter, integrate, and split output signals from a plurality of imaging sensor signals separately from a plurality of dedicated sensors and a plurality of specialized sensors.

20. The x-ray imaging system of claim 16, wherein output signals of the plurality of imaging sensors are processed to generate a medical image, output signals of dedicated sensors of the plurality of non-imaging sensors are processed to detect a focal spot location, and output signals of specialized sensors of the plurality of non-imaging sensors are processed to monitor temperature, humidity, and strain-gauge measurements.

\* \* \* \* \*